US012717338B2

(12) United States Patent
Wang et al.

(10) Patent No.: US 12,717,338 B2
(45) Date of Patent: Aug. 25, 2026

(54) MOTION CONTROL METHOD OF MOBILE ROBOT AND MOBILE ROBOT

(71) Applicant: Tencent Technology (Shenzhen) Company Limited, Shenzhen (CN)

(72) Inventors: Shuai Wang, Shenzhen (CN); Jingfan Zhang, Shenzhen (CN); Zhaoxiang Li, Shenzhen (CN); Jiahao Wang, Shenzhen (CN); Yu Zheng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/598,998

(22) Filed: Mar. 7, 2024

(65) Prior Publication Data

US 2024/0219917 A1 Jul. 4, 2024

Related U.S. Application Data

(63) Continuation of application No. PCT/CN2023/101849, filed on Jun. 21, 2023.

(30) Foreign Application Priority Data

Aug. 20, 2022 (CN) ........................ 202211002000.6

(51) Int. Cl.
*G05D 1/241* (2024.01)
*B60G 17/019* (2006.01)

(52) U.S. Cl.
CPC .......... *G05D 1/241* (2024.01); *B60G 17/019* (2013.01); *B60G 2500/30* (2013.01)

(58) Field of Classification Search
CPC ............... G05D 1/241; G05D 2109/16; G05D 2109/12; G05D 2109/13; B60G 17/019; B60G 2500/30

(Continued)

(56) References Cited

U.S. PATENT DOCUMENTS 5,823,845 A * 10/1998 O'Berrigan ............ A63H 11/14 446/234
6,042,449 A * 3/2000 Ishimoto ................ A63H 11/14 446/233

(Continued)

FOREIGN PATENT DOCUMENTS

CN 103345285 A 10/2013
CN 109664310 A * 4/2019 .............. B25J 11/00

(Continued)

OTHER PUBLICATIONS

International Search Report and Written Opinion received for PCT Patent Application No. PCT/CN2023/101849, mailed on Sep. 30, 2023, 17 pages (6 pages of English Translation and 11 pages of Original Document).

(Continued)

*Primary Examiner* — Yi-Kai Wang
(74) *Attorney, Agent, or Firm* — ArentFox Schiff LLP

(57) ABSTRACT

In a motion control method of a mobile robot, a tactile touch operation on a sensing device of the mobile robot is received. The mobile robot is controlled to perform an interactive motion of a plurality of interactive motions that is associated with the tactile touch operation. Each of the plurality of interactive motions is associated with a respective predefined tactile touch operation. The interactive motion corresponds to the tactile touch operation. At least one of a wheel portion or a base portion of the mobile robot performs a motion during the interactive motion. Apparatus and non-transitory computer-readable storage medium counterpart embodiments are also contemplated.

20 Claims, 13 Drawing Sheets

(58) Field of Classification Search
USPC ............................................................ 701/37
See application file for complete search history.

(56) References Cited

U.S. PATENT DOCUMENTS

| | | | | |
|---|---|---|---|---|
| 11,180,205 | B2 * | 11/2021 | Amino | B25J 5/007 |
| 2017/0106738 | A1 * | 4/2017 | Gillett | B62K 11/007 |
| 2018/0231970 | A1 * | 8/2018 | Qu | G06F 1/169 |
| 2020/0262460 | A1 * | 8/2020 | Kim | B62B 5/0073 |

FOREIGN PATENT DOCUMENTS

| | | | | | |
|---|---|---|---|---|---|
| CN | 111267990 | A | * | 6/2020 | B62D 57/028 |
| EP | 3702865 | A1 | | 9/2020 | |
| FR | 3106328 | A1 | | 7/2021 | |
| JP | 2004034169 | A | * | 2/2004 | A63H 11/00 |
| KR | 100873723 | B1 | * | 12/2008 | B25J 13/08 |

OTHER PUBLICATIONS

Extended European Search Report received for European Patent Application No. 23856243.3, mailed on Dec. 2, 2024, 8 pages.

* cited by examiner

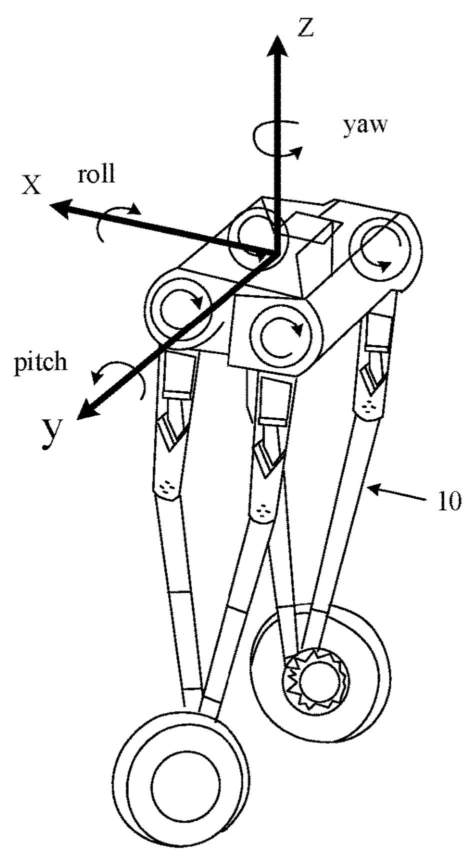
FIG. 13
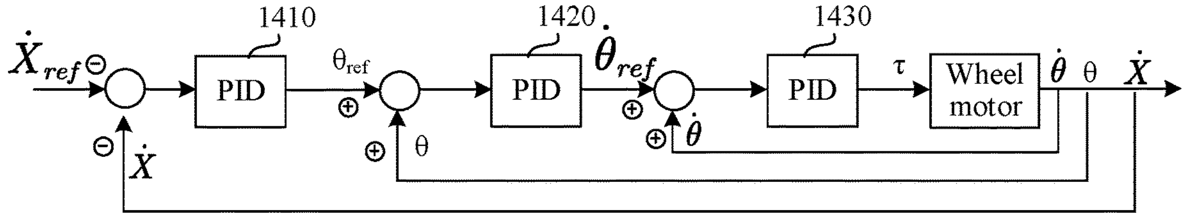
FIG. 14
102
Receive a tactile pressing operation on a sensing device
104
Control a mobile robot to perform an interactive motion in response to the tactile pressing operation, the interactive motion being a motion corresponding to the tactile pressing operation, and at least one of a wheel portion and a base portion performing a motion during the interactive motion
FIG. 15

Receiving module 2720

Control module 2740

MOTION CONTROL METHOD OF MOBILE ROBOT AND MOBILE ROBOT

RELATED APPLICATIONS

The present application is a continuation of International Application No. PCT/CN2023/101849, filed on Jun. 21, 2023, which claims priority to Chinese Patent Application No. 202211002000.6, entitled "MOTION CONTROL METHOD OF MOBILE ROBOT AND MOBILE ROBOT" filed on Aug. 20, 2022. The entire disclosures of the prior applications are hereby incorporated by reference.

FIELD OF THE TECHNOLOGY

This disclosure relates to the field of robots, including to a motion control method of a mobile robot and a mobile robot.

BACKGROUND OF THE DISCLOSURE

A human-computer interaction with a mobile robot is usually performed based on a visual signal or a voice signal. For example, sensing information is acquired by a lidar and a camera to realize the human-computer interaction. In another example, voice information is acquired by voice recognition to realize the human-computer interaction. Alternatively, an operator controls the robot to interact through control instructions.

During the above-mentioned human-computer interaction, a response of the mobile robot is usually a single voice reply, or a motion according to a simple specified moving mode.

SUMMARY

Aspects of this disclosure include a motion control method of a mobile robot and a mobile robot. The technical solution includes at least the following schemes.

According to one aspect of this disclosure, a motion control method of a mobile robot is provided. A tactile touch operation on a sensing device of the mobile robot is received. The mobile robot is controlled to perform an interactive motion of a plurality of interactive motions that is associated with the tactile touch operation. Each of the plurality of interactive motions is associated with a respective predefined tactile touch operation. The interactive motion corresponds to the tactile touch operation. At least one of a wheel portion or a base portion of the mobile robot performs a motion during the interactive motion.

According to one aspect of this disclosure, a motion control apparatus of a mobile robot is provided. The apparatus includes processing circuitry that is configured to receive a tactile touch operation on a sensing device of the mobile robot. The processing circuitry is configured to control the mobile robot to perform an interactive motion of a plurality of interactive motions that is associated with the tactile touch operation. Each of the plurality of interactive motions is associated with a respective predefined tactile touch operation. The interactive motion corresponds to the tactile touch operation. At least one of a wheel portion or a base portion of the mobile robot performs a motion during the interactive motion.

According to one aspect of this disclosure, a mobile robot is provided. The mobile robot includes a wheel portion, a base portion connected to the wheel portion, and a sensing device on the base portion. The mobile robot further includes a motion control apparatus.

According to one aspect of this disclosure, a computer device is provided. The computer device includes a memory and a processor. The memory stores at least one program code. The program code is loaded and executed by the processor to implement a motion control method of the mobile robot.

According to one aspect of this disclosure, a non-transitory computer-readable storage medium is provided. The non-transitory computer-readable storage medium stores instructions which when executed by a processor cause the processor to implement a motion control method of the mobile robot.

According to one aspect of this disclosure, a chip is provided. The chip includes a programmable logic circuit and/or program instructions for implementing a motion control method of the mobile robot when an electronic device installed with the chip is operated.

According to one aspect of this disclosure, a computer program product is provided. The computer program product includes computer instructions. The computer instructions are stored in a computer-readable storage medium, and a processor reads and executes the computer instructions from the computer-readable storage medium to implement a motion control method of the mobile robot.

Beneficial effects brought about by the technical solution provided by this aspect of this disclosure include the following.

A tactile pressing operation on a sensing device is received by the sensing device on a base portion, so that a mobile robot implements an interactive motion corresponding to the tactile pressing operation. The sensing device may be regarded as an electronic skin on the base portion, and a novel human-computer interaction method is provided for the mobile robot by the tactile pressing operation on the electronic skin.

BRIEF DESCRIPTION OF THE DRAWINGS

FIG. 13 is a schematic diagram of three space angles according to an exemplary aspect of this disclosure.

FIG. 14 is a block diagram of balance control in a pitch direction according to an exemplary aspect of this disclosure.

FIG. 15 is a flowchart of a motion control method of a mobile robot according to an exemplary aspect of this disclosure.

DETAILED DESCRIPTION

A motion control method of a mobile robot provided by aspects of this disclosure may be used for various types of robots, including any one of a redundantly-actuated system robot, a fully-actuated system robot, and an underactuated system robot. The redundantly-actuated system robot may refer to a robot in which the number of actuations is greater than the number of joint degrees of freedom. The fully-actuated system robot may refer to a robot in which the number of actuations is equal to the number of joint degrees of freedom. The underactuated system robot may refer to a robot in which the number of actuations is less than the number of joint degrees of freedom.

The underactuated system robot has instability and body balance problem, which makes it more difficult to perform motion control than the other two types of robots. The balance control of a wheel-legged robot, for example, is more challenging, and needs to be realized by linear and nonlinear control technologies.

In some aspects, the motion control method provided by this aspect of this disclosure is applied to the underactuated system robot. In an aspect, the motion control method provided by this aspect of this disclosure is applied to the wheel-legged robot. The underactuated system robot will be described as an example below. The redundantly-actuated system robot and the fully-actuated system robot are similar to the underactuated system robot, may be described with reference to the underactuated system robot.

Figure 1:
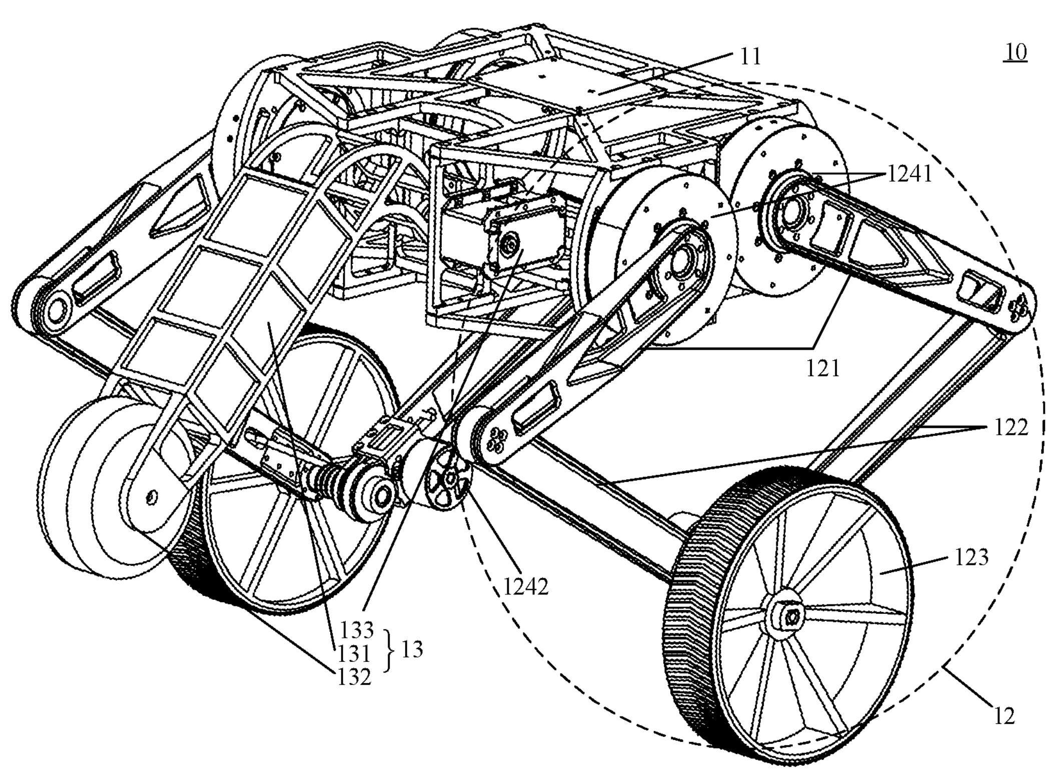
FIG. 1 is a schematic structural diagram of a wheel-legged robot according to an exemplary aspect of this disclosure.

FIG. 1 shows a wheel-legged robot 10 according to an exemplary aspect of this disclosure. The wheel-legged robot 10 is one of underactuated system robots. The wheel-legged robot 10, in combination with the advantages of a wheeled robot and a legged robot, has high wheel energy efficiency and strong adaptability, and may avoid obstacles on uneven terrain with legs. The wheel-legged robot 10 is an unstable underactuated system with only two contact points between the ground and wheels/legs, which makes balance control of the wheel-legged robot 10 challenging because it is difficult to obtain body balance.

The wheel-legged robot 10 includes a base portion 11, a wheel portion 12, and a tail portion 13. The wheel portion 12 and the tail portion 13 are in transmission connection with the base portion 11. The wheel portion 12 may be divided into left and right sides, and the left and right sides may be completely symmetrical or not completely symmetrical.

The wheel portion 12 includes a leg and a wheel. The leg includes a thigh unit 121 and a calf unit 122, and the wheel includes a driving wheel 123. For example, the thigh unit 121 is composed of two rods, and the calf unit 122 is composed of two rods. The two rods included in the thigh unit 121, the two rods included in the calf unit 122, and the base portion 11 form a planar five-link mechanism.

In an example, a first drive motor 1241 is fixed to the base portion 11 for supplying a drive force to the thigh unit 121.

For example, the first drive motor 1241 includes two motors. The two rods included in the thigh unit 121 are fixedly connected to output shafts of the two motors included in the first drive motor 1241, respectively. The connected ends of the two rods included in the thigh unit 121 and the two rods included in the calf unit 122 are connected in the form of rotating pairs to form a planar five-link mechanism.

In an example, a second drive motor 1242 is fixed to a certain rod of the calf unit 122 for supplying a drive force to the driving wheel 123.

Figure 2:
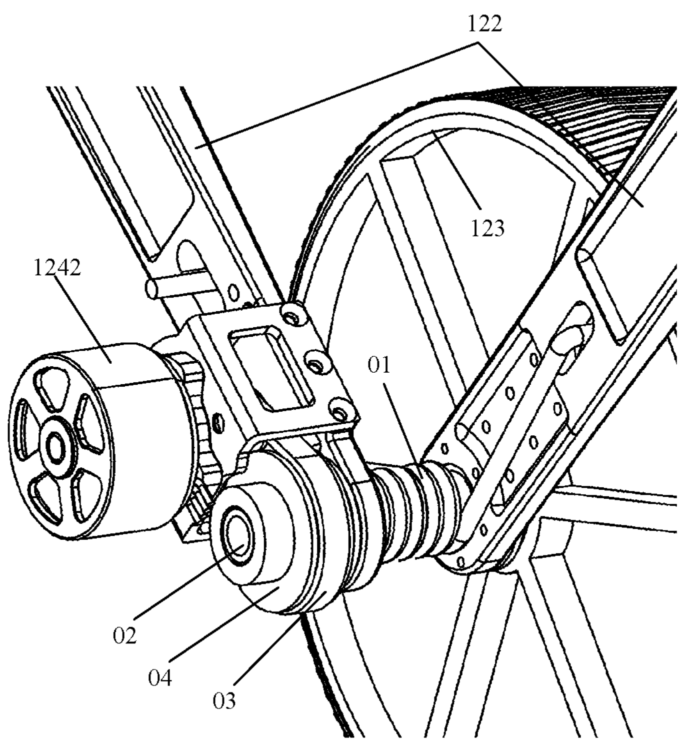
FIG. 2 is a schematic partial diagram of a wheel-legged robot according to an exemplary aspect of this disclosure.

Referring to a schematic partial diagram of the wheel-legged robot 10 shown in FIG. 2, the drive of the driving wheel 123 may be realized in the following modes. The second drive motor 1242 drives a rotating shaft 02 of the driving wheel 123 through a belt drive. The rotation shaft 02 is coaxial with an axial direction of the rotating pair between the two rods included in the calf unit 122. A torsion spring 01 is sleeved on the rotating shaft 02, and arms of the torsion spring 01 are fixed to the two rods included in the calf unit 122 respectively.

In an example, a synchronous belt pulley 04 is installed on an output shaft of the second drive motor 1242. The synchronous belt pulley 04 is fixed on the rotating shaft 02. The driving wheel 123 is fixed on the other section of the rotating shaft 02. A synchronous belt 03 is sleeved on the synchronous belt pulley 04, and the second drive motor 1242 drives the synchronous belt pulley 04 to rotate by driving the synchronous belt 03, thus driving the driving wheel 123 to rotate.

In an example, in the wheel-legged robot 10 provided by this aspect of this disclosure, the tail portion 13 includes a weight leg 131, a driven wheel 132, and a third drive motor 133. The weight leg 131 realizes a balance function during the motion of the wheel-legged robot 10, and the third drive motor 133 is configured to supply a drive force to the driven wheel 132.

Figure 3:
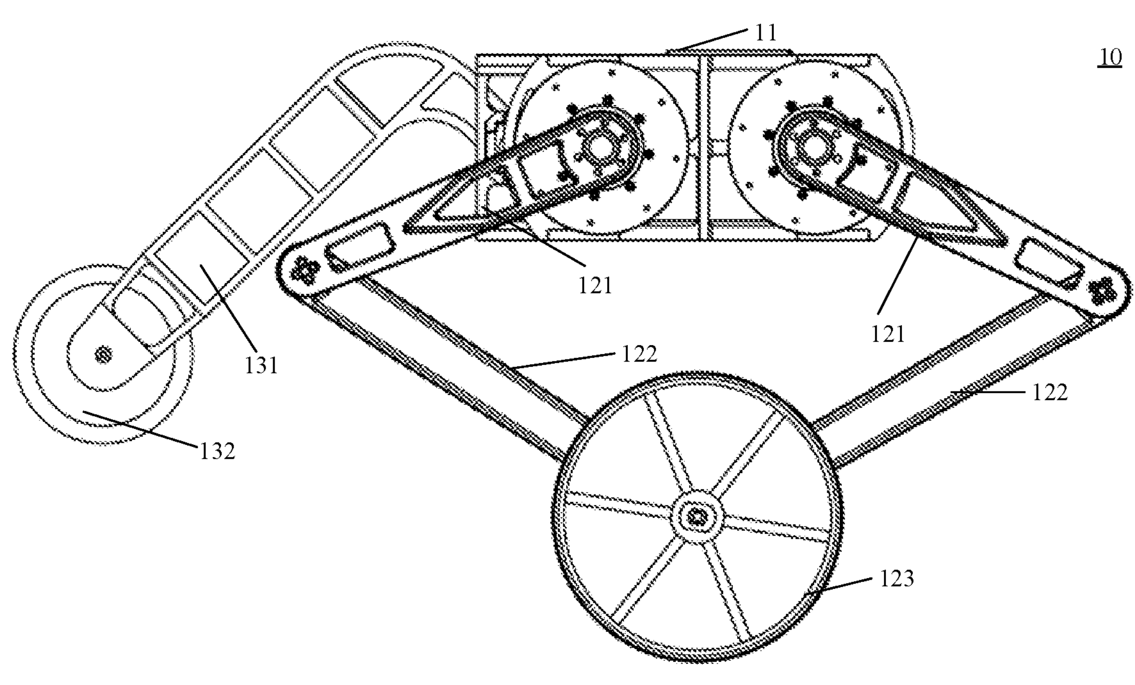
FIG. 3 is a front view of a wheel-legged robot in a two-wheel standing condition according to an exemplary aspect of this disclosure.
Figure 4:
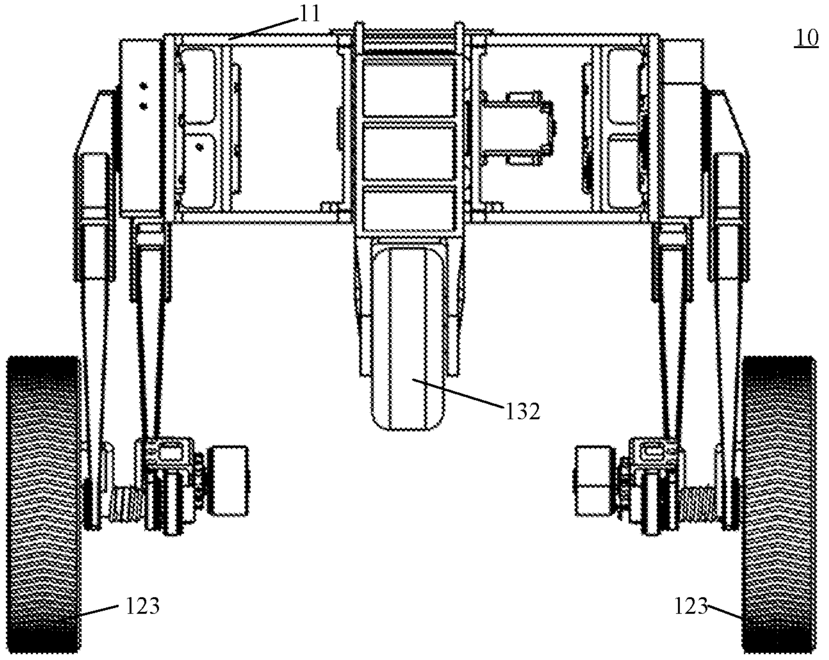
FIG. 4 is a side view of a wheel-legged robot in a two-wheel standing condition according to an exemplary aspect of this disclosure.
Figure 5:
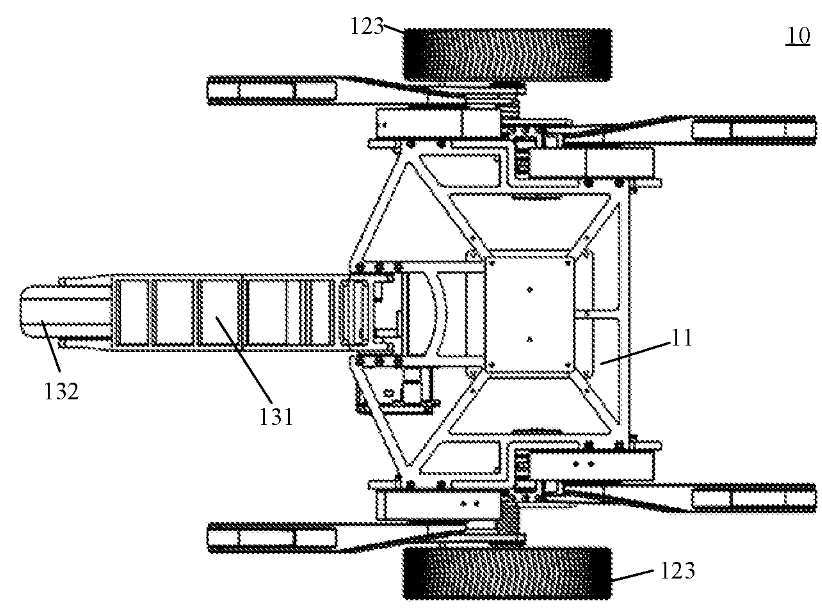
FIG. 5 is a top view of a wheel-legged robot in a two-wheel standing condition according to an exemplary aspect of this disclosure.
Figure 6:
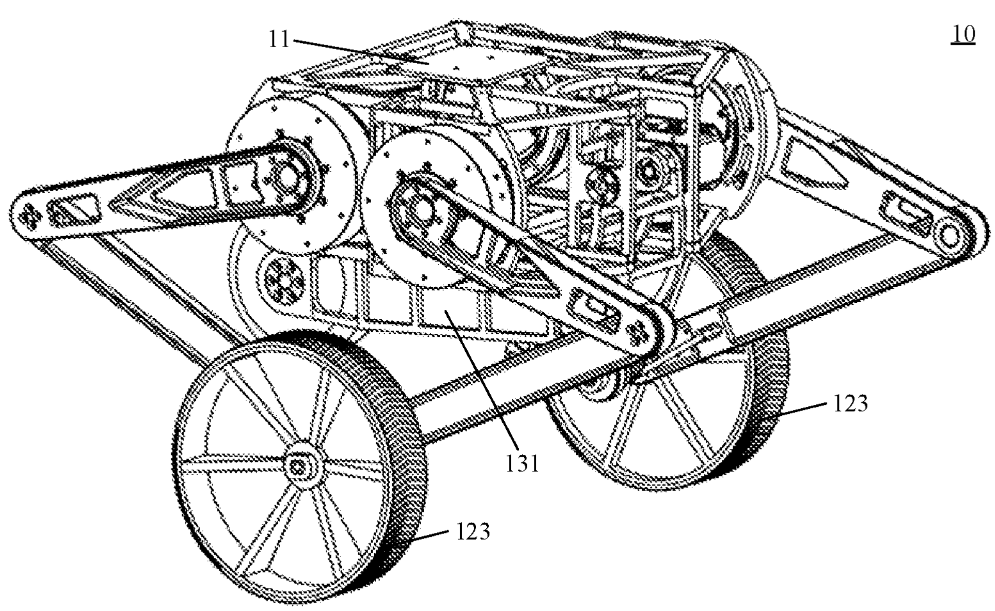
FIG. 6 shows a three-dimensional schematic diagram of a wheel-legged robot with a weight leg in a fold-in state according to an exemplary aspect of this disclosure.

FIG. 3 to FIG. 5 show a front view, a left view, and a top view of the wheel-legged robot 10 in a two-wheel standing condition, respectively. FIG. 6 shows a three-dimensional schematic diagram of the wheel-legged robot 10 with the weight leg 131 in a fold-in state.

Figure 7:
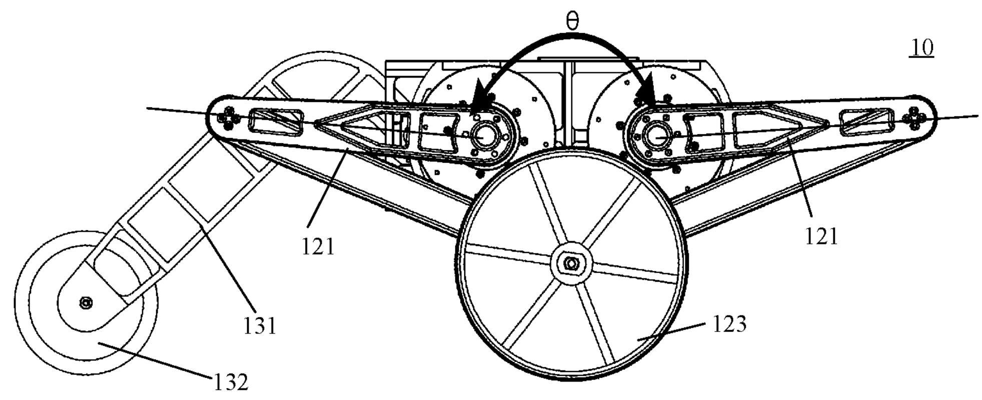
FIG. 7 is a front view of a wheel-legged robot in a three-wheel standing condition according to an exemplary aspect of this disclosure.
Figure 8:
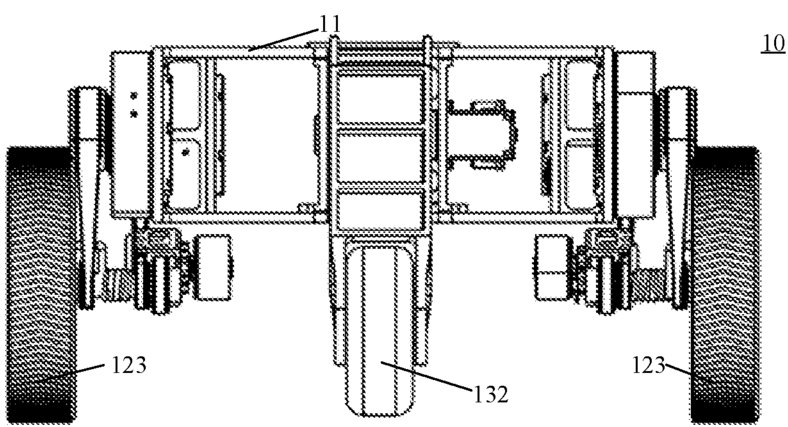
FIG. 8 is a side view of a wheel-legged robot in a three-wheel standing condition according to an exemplary aspect of this disclosure.
Figure 9:
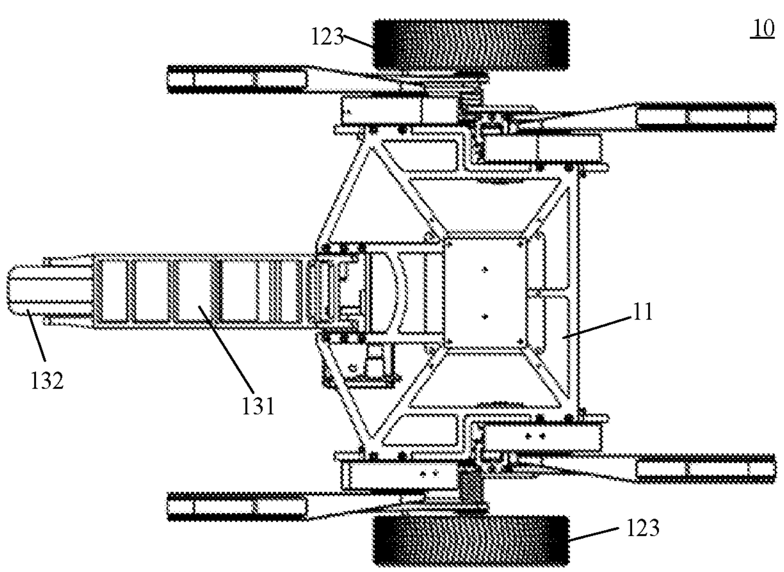
FIG. 9 is a top view of a wheel-legged robot in a three-wheel standing condition according to an exemplary aspect of this disclosure.
Figure 10:
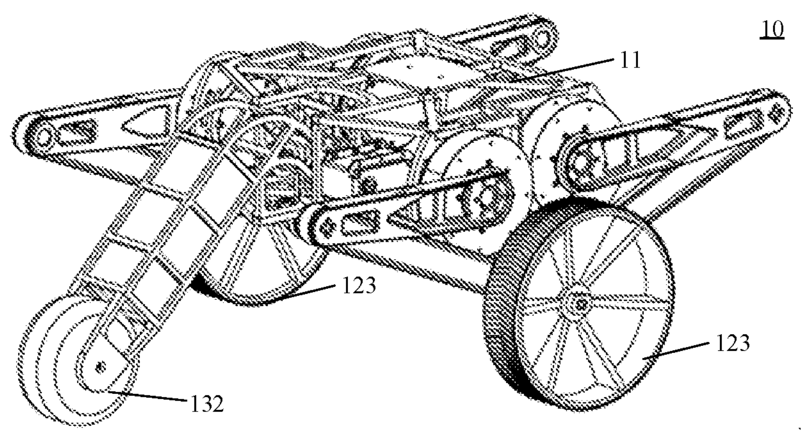
FIG. 10 is a three-dimensional schematic diagram of a wheel-legged robot in a three-wheel standing condition according to an exemplary aspect of this disclosure.
Figure 11:
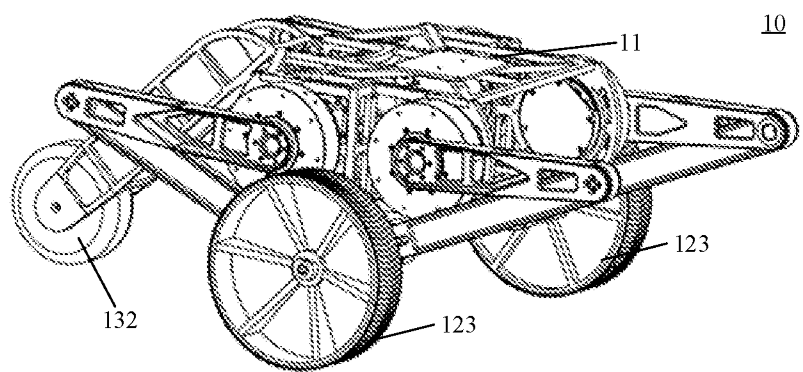
FIG. 11 is another three-dimensional schematic diagram of a wheel-legged robot in a three-wheel standing condition according to an exemplary aspect of this disclosure.

In an implementation scenario, the wheel-legged robot 10 may also be in a three-wheel standing state. When the wheel-legged robot 10 is in a three-wheel standing condition, FIG. 7 to FIG. 9 show a front view, a left view, and a top view of the wheel-legged robot 10 in the three-wheel standing condition. FIG. 10 and FIG. 11 show different three-dimensional diagrams of the wheel-legged robot 10 in the three-wheel standing condition, respectively.

Referring to FIG. 7, a position angle formed by axis lines of the two rods included in the thigh unit 121 is, for example, θ. The position angle θ is less than 180°, and the mechanism may be in a self-stabilizing state.

Figure 12:
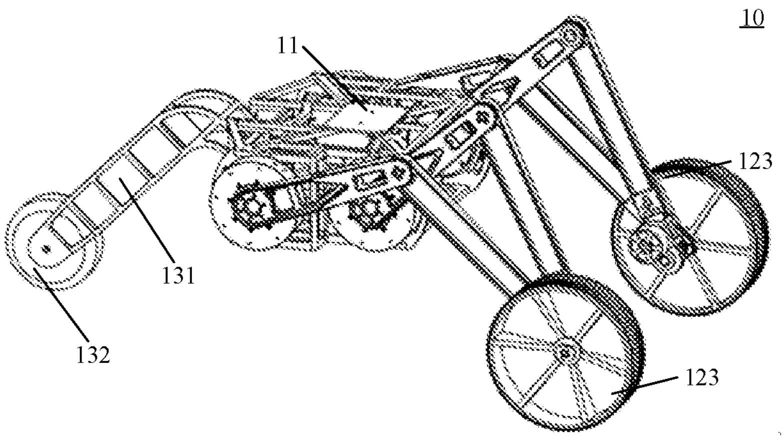
FIG. 12 is a schematic form diagram of a wheel-legged robot according to an exemplary aspect of this disclosure.

In an implementation scenario, the wheel-legged robot 10 may also be in other forms. An example of one of the forms is given in FIG. 12.

It is to be understood that the wheel-legged robot 10 is one of underactuated system robots. The following aspects of this disclosure are only exemplified by the wheel-legged robot 10. The specific structure and the configuration of the wheel-legged robot 10 may be set according to actual conditions and are not limited in this disclosure.

In order to realize the balance of the wheel-legged robot 10, it is usually necessary to perform balance feedback control on the wheel-legged robot 10. The balance feedback control is mainly to feed back a self-balance measurement value to a control system, so that a final balance measurement value reaches the standard.

FIG. 13 is a schematic diagram of three space angles according to an exemplary aspect of this disclosure. In this aspect of this disclosure, the balance is mainly performed by three space angles: pitch, yaw, and roll.

Referring to FIG. 13, a right-hand Cartesian coordinate system of a three-dimensional control is established for the wheel-legged robot 10. The pitch is an angle rotating about an x-axis, which is a coordinate axis along a forward direction of the wheel-legged robot 10, corresponds to the roll, and is represented by θ later. The yaw is an angle rotating about a y-axis, which is a coordinate axis along a two-wheel connection direction of the wheel-legged robot 10, corresponds to the pitch, and is represented by ϕ later. The roll is an angle rotating about a z-axis, which is a coordinate axis along a vertical upward direction, corresponds to the yaw, and is represented by φ later.

The balance control in the pitch direction is explained as an example:

The angle in the pitch direction represents a swinging amplitude of the wheel-legged robot 10 in the forward direction. That is, the angle in the pitch direction represents an angle at which the wheel-legged robot 10 swings front and back in a control direction of wheel rotation, generated due to the existence of only a single contact point between each wheel and a motion surface and the lateral arrangement of the wheels of the wheel-legged robot 10.

The control in the pitch direction is composed of a plurality of closed-loop proportional-integral-derivative (PID) controllers. The wheel-legged robot 10 is projected onto a two-dimensional plane to form a two-dimensional plane simplified model. X represents a distance of a wheel center moving laterally in the two-dimensional plane simplified model. If the wheel does not slip or leave the ground, X is equal to the product of a rotation angle of the wheel and a radius of the wheel.

For example, $\dot{X}$ represents a moving speed of the wheel center, $\dot{X}_{ref}$ represents a reference moving speed of the wheel center, and θ represents the pitch of the wheel-legged robot 10, that is, an angle of rotation about a direction perpendicular to a paper surface in the two-dimensional plane simplified model. Accordingly, $\dot{\theta}$ represents a pitch speed of the wheel-legged robot 10, $\dot{\theta}_{ref}$ represents a pitch speed reference value of the wheel-legged robot 10, and τ represents a moment inputted to a wheel motor of the wheel-legged robot 10. θ, $\dot{\theta}$, and $\dot{X}$ are collected by sensors. For example, θ and $\dot{\theta}$ are acquired by an inertial measurement unit (IMU), and $\dot{X}$ is acquired by an encoder sensor of the wheel.

FIG. 14 shows a block diagram of balance control in a pitch direction according to an exemplary aspect of this disclosure. An outermost control reference quantity is the moving speed reference value $\dot{X}_{ref}$ of the wheel center.

First, the moving reference speed $\dot{X}_{ref}$ of the wheel center is acquired, that is, the speed to be reached according to the motion expectation, and the moving speed $\dot{X}$ of the wheel center collected by the sensor. The result obtained by subtracting $\dot{X}_{ref}$ from the moving speed $\dot{X}$ of the wheel center is inputted to a PID controller 1410, and $\theta_{ref}$ is outputted by the PID controller 1410.

Second, $\theta_{ref}$ is used as a control reference quantity for a next control loop. $\theta_{ref}$ and θ are subtracted to obtain a pitch difference, that is, a difference between a current pitch and a reference pitch. The pitch difference is inputted to a PID controller 1420 to obtain $\dot{\theta}_{ref}$. Then, $\dot{\theta}_{ref}$ is used as a control reference quantity for a next control loop. The result obtained by subtracting $\dot{\theta}_{ref}$ from θ is inputted to a PID controller 1430, and τ is outputted by the PID controller 1430. τ is transmitted to the wheel motor of the wheel-legged robot 10 to realize the balance control of the robot.

Meanwhile, after the state of the wheel-legged robot 10 is correspondingly changed, the values of θ, $\dot{\theta}$, and $\dot{X}$ are correspondingly changed, and these values are obtained by sensors and then used in a new round of control of the wheel-legged robot 10, thereby forming a control closed loop.

τ obtained according to the above balance control may be used as a wheel rotation reference signal of a whole body type controller of the wheel-legged robot 10. There are many modes to realize the calculation and generation method of the reference signal. This disclosure is only an example. Other calculation and generation methods for acquiring τ are not limited in this disclosure.

In an example, the balance control in the yaw and roll directions is similar to the balance control in the pitch direction, may be described with reference thereto, and will not be repeated herein.

Based on the foregoing, this disclosure provides a motion control method of a mobile robot, which controls the mobile robot to realize an interactive motion corresponding to a tactile pressing operation (or tactile touch operation) on a sensing device through the sensor device arranged on a base portion.

The mobile robot will be described as an underactuated system robot below. A redundantly-actuated system robot and a fully-actuated system robot are similar to the underactuated system robot, may be described with reference to the underactuated system robot, and will not be repeated herein.

FIG. 15 shows a flowchart of a motion control method of a mobile robot according to an exemplary aspect of this disclosure. The mobile robot includes a wheel portion and a base portion connected to the wheel portion. The base portion is provided with a somatosensory sensing device.

In some aspects, the mobile robot is an underactuated system robot.

Referring to FIG. 1 and FIG. 6, the underactuated system robot is, for example, a wheel-legged robot 10. The tail portion 13 of the wheel-legged robot 10 shown in FIG. 1 is in an unfolded state, and the tail portion 13 of the wheel-legged robot 10 shown in FIG. 6 is in a folded state. Exemplarily, when the tail portion 13 is in the folded state, the forward direction of the wheel-legged robot 10 is a direction in which the weight leg 131 points to the driven wheel 132.

In the following aspects, the mobile robot is the wheel-legged robot 10 under the premise that the forward direction of the mobile robot is a direction in which the weight leg 131 points to the driven wheel 132 when the tail portion 13 is in the folded state. At this moment, the backward direction is an opposite direction to the forward direction, the left of the forward direction is a left direction, and the right of the forward direction is a right direction.

The "forward direction", the "backward direction", "left", and "right" referred to in the following aspects are all based on this and will not be repeated herein.

The sensing device is a device for detecting contact information between the mobile robot and the outside. In some aspects, the sensing device is a force/tactile sensing device and may also be represented as a force-tactile sensing device. The sensing device may be implemented as any one of a force sensor, a tactile sensor, and a force-tactile sensor. The sensing device may include a somatosensory sensing device, for example The motion control method provided by this aspect of this disclosure may be executed by a controller in the mobile robot. The method may include the following steps:

Step 102: Receive a tactile pressing operation on the sensing device.

The sensing device may be composed of an m×n pressure sensor array.

In an example, an upper surface of the base portion is provided with a tactile sensor. The tactile sensor includes a pressure sensor array arranged in an m×n matrix. The length and width of the m×n matrix are adapted to the upper surface of the base portion, where m and n are positive integers. For example, if the size of the upper surface of the base portion is 40 cm*20 cm, tactile sensor pressure collection points may be placed at an interval of 1 cm, and a pressure dot matrix of the upper surface of the base portion forms a corresponding 40*20 dot array.

It is to be understood that in practical applications, the interval between the pressure dot matrices of the tactile sensor may be adaptively changed and the values of m and n may be adaptively adjusted according to changes in the size of the upper surface of the base portion and differences in an initial speed and a pressure detection range in an application scenario, including the delay of motor underlying control, etc. The above are only examples and are not specifically limited to the values of m and n involved in this disclosure.

In some aspects, the sensing device may be considered as an electronic skin arranged on the base portion for sensing the touch of an operator's finger on the upper surface of the base portion. For example, the tactile pressing operation is a touch operation performed on the sensing device.

For example, the tactile pressing operation is used for indicating a pressing operation performed on the sensing device, so that the sensing device obtains a contact position and/or force information of a contact. The tactile pressing operation may be realized in many modes. For example, the operator presses on the sensing device with a finger, presses on the sensing device with a palm, or presses on the sensing device with a stylus. The various pressing modes may be single-point pressing or continuous multi-point pressing.

In some aspects, the tactile pressing operation is achieved by the operator pressing on the sensing device with a finger, and the tactile pressing operation may be regarded as a fingertip pressing operation. Aspects given below are all exemplified by the operator pressing on the sensing device with a finger but are not limited in this disclosure. It is to be understood that other pressing modes are similar thereto, may be described with reference thereto, and will not be repeated herein.

The tactile pressing operation includes many types. For example, the operator presses a little on the sensing device and then leaves. For another example, the operator quickly draws a straight line on the sensing device.

In an example, the tactile pressing operation includes at least one of the following operations:

Single-Point Pressing Operation: The single-point pressing operation is an instantaneous touch performed on the sensing device, and the instantaneous touch does not form a moving trajectory on the sensing device.

In some aspects, the sensing device may be partitioned to facilitate detection of the tactile pressing operation, and each partition may be assigned a plate identifier. When receiving the tactile pressing operation, a target pose sequence signal corresponding to the tactile pressing operation may be obtained by at least one contact of the operator on the sensing device. The target pose sequence signal is used for indicating related information of the at least one contact. For example, the sensing device is divided into six plates, and at least the plate identifier of the pressed contact can be obtained by the operator pressing on at least one of the six plates.

In an example, the single-point pressing operation includes at least one of the following operations: a first single-point pressing operation, a second single-point pressing operation, and a third single-point pressing operation.

The first single-point pressing operation is an instant touch on a first plate of the sensing device, and the first plate is a plate on the sensing device away from the forward direction of the mobile robot. The second single-point pressing operation is an instant touch on a second plate of the sensing device, and the second plate is a plate on the sensing device away from the backward direction of the mobile robot. The third single-point pressing operation is an instant touch on a third plate of the sensing device, and the third plate is the remaining plate of the sensing device except the first plate and the second plate. The instant touch is a single touch, for example.

For example, the sensing device is divided into six plates, which are in two rows and three columns. The three plates in the first row are close to the forward direction of the mobile robot, and the three plates in the second row are close to the backward direction of the mobile robot. The first plate is a middle plate in the second row, the second plate is a middle plate in the first row, and the third plate is one of the remaining four plates.

Continuous Pressing Operation: The continuous pressing operation is a continuous touch on the sensing device, and the continuous touch forms a moving trajectory on the sensing device.

It is to be understood that the continuous pressing operation is stick figure sketching by the operator on the sensing device, and a motion trajectory thereof may be either a straight line or a curve.

In an example, the continuous pressing operation includes at least one of the following operations: a first continuous pressing operation, a second continuous pressing operation, a third continuous pressing operation, a fourth continuous pressing operation, and a fifth continuous pressing operation.

The first continuous pressing operation and the second continuous pressing operation are straight lines drawn by the operator on the sensing device. The third continuous pressing operation, the fourth continuous pressing operation, and the fifth continuous pressing operation are different curves drawn by the operator on the sensing device.

In an example, a pattern corresponding to the first continuous pressing operation is a first straight line, and a direction of the first straight line is a direction perpendicular to the forward direction of the mobile robot. A pattern corresponding to the second continuous pressing operation is a second straight line, and a direction of the second straight line is the forward direction of the mobile robot. A pattern corresponding to the third continuous pressing operation is a circle. A pattern corresponding to the fourth continuous pressing operation is U. A pattern corresponding to the fifth continuous pressing operation is a heart.

Step 104: Control the mobile robot to perform an interactive motion in response to the tactile pressing operation.

The interactive motion is a motion corresponding to the tactile pressing operation. At least one of the wheel portion and the base portion performs a motion during the interactive motion.

In some aspects, the tactile pressing operation is a stick figure sketching operation performed by the operator on the sensing device that imitates a biological motion state, and one tactile pressing operation corresponds to a stick figure sketching mode of one biological motion state. It is to be understood that one tactile pressing operation corresponds to one interactive motion.

In an example, the interactive motion includes one of the following motions:

Moving Motion: The moving motion is a displacement motion performed by the mobile robot.

It is to be understood that the moving motion may be divided into a first moving motion and a second moving motion. The first moving motion is a motion in which the mobile robot moves in the forward direction, and the second moving motion is a motion in which the mobile robot moves in the backward direction. It is to be understood that the moving motion is the forward or backward motion of the mobile robot.

Steering Motion: The steering motion is a motion of changing the forward direction of the mobile robot.

It is to be understood that the steering motion is rotation of the mobile robot, and a rotation angle does not exceed 180 degrees. For example, the mobile robot is controlled to rotate leftward by 45 degrees, and the left front of the original forward direction is determined as a new forward direction.

·Shaking Motion: The shaking motion is a body shaking motion of the mobile robot according to a moving trajectory of the tactile pressing operation.

The shaking motion may be divided into a first shaking motion and a second shaking motion. The first shaking motion is a motion in a shaking direction that is a direction of the wheel portion relative to the base portion. The second shaking motion is a motion in a shaking direction that is the forward direction or the backward direction of the mobile robot. It is also to be understood that the first shaking motion is the mobile robot shaking from side to side, and the second shaking motion is the mobile robot nodding front and back.

The first shaking motion may be realized by alternately lengthening and shortening the legs of the two wheel portions of the mobile robot, that is, by controlling the wheel portions to alternately change the leg height. For example, the first shaking motion may be realized by alternately controlling the leg of the left wheel portion to be shortened and the leg of the right wheel portion to be lengthened, and controlling the leg of the left wheel portion to be lengthened and the leg of the right wheel portion to be shortened at a next time. The second shaking motion may be realized by alternately lengthening and shortening two leg support rods on each wheel portion, that is, by controlling the first leg support rod and the second leg support rod of each wheel portion to be alternately lengthened and shortened. For example, each wheel portion includes a wheel leg support rod close to the forward direction and a wheel leg support rod close to the backward direction. The second shaking motion may be realized by alternately controlling the wheel leg support rod close to the forward direction to be shortened and the wheel leg support rod close to the backward direction to be lengthened, and controlling the wheel leg support rod close to the forward direction to be lengthened and the wheel leg support rod close to the backward direction to be shortened at a next time.

In the first shaking motion and the second shaking motion, a shaking amplitude of the mobile robot is determined according to the tactile pressing operation. The sensing device is divided into six plates and the tactile pressing operation is the first continuous pressing operation corresponding to a horizontal line drawn by the operator on the sensing device. It is to be understood that the shaking amplitude of the mobile robot is determined according to at least one of a length of the horizontal line, an initial contact position of the horizontal line on the sensing device, and a drawing speed of the horizontal line.

Exemplarily, an inclination angle of the base portion is determined according to the length of the horizontal line. As the horizontal line is longer, the inclination angle is greater, and vice versa. According to the initial contact position of the horizontal line on the sensing device, a direction in which the base portion is inclined first is determined. For example, if the initial contact position is close to the position of the left wheel portion, the base portion is controlled to be inclined leftward first. The shaking speed of the mobile robot is determined according to the drawing speed of the horizontal line. As the drawing speed is higher, the shaking speed is higher, and vice versa.

Turning Motion: The turning motion is a one-circle rotation motion performed by the mobile robot.

It is to be understood that the turning motion is positive and negative rotation of the mobile robot, and a rotation angle is 360 degrees. After the mobile robot performs the turning motion, the forward direction of the mobile robot remains unchanged. For example, if the operator draws a circle clockwise on the sensing device, the mobile robot is controlled to rotate clockwise for a circle.

Fluctuating Motion: The fluctuating motion is a motion in which a vertical height of the mobile robot changes.

It is to be understood that the fluctuating motion is squatting of the mobile robot. In an example, after the mobile robot performs the fluctuating motion, the height of the mobile robot remains unchanged. For example, if the operator draws a U-shaped curve with an opening facing the forward direction on the sensing device, the vertical height of the wheel portion is controlled to descend and then ascend until the height returns to the height before descending.

Swinging Motion: The swinging motion is a body swinging motion performed by the mobile robot.

The swinging motion is similar to the first shaking motion, which is the mobile robot shaking from side to side. The difference is that the shaking amplitude of the first shaking motion is determined according to the tactile pressing operation, while the shaking amplitude and/or the shaking speed of the swinging motion are fixed.

It is to be understood that during the swinging motion, the wheel portion alternately changes the leg height with a fixed height and/or shaking speed. For example, when the operator draws a horizontal line on the sensing device, the mobile robot is controlled to perform the first shaking motion, and the change of the leg height of the wheel portion is determined according to the length of the horizontal line. When the operator draws a heart-shaped curve on the sensing device, the mobile robot is controlled to perform the swinging motion, and the legs of the wheel portion alternately change with a fixed height and/or shaking speed.

According to the foregoing, there are a variety of tactile pressing operations, and there are also a variety of interactive motions. The tactile pressing operations correspond to the interactive motions one by one, and one tactile pressing operation corresponds to one interactive motion. It is to be understood that the correspondence between the tactile pressing operation and the interactive motion may be combined or set according to actual needs. This disclosure is not limited herein.

According to the foregoing, the sensing device can obtain a contact position and/or force information of a contact by the tactile pressing operation. A plurality of examples in the foregoing are examples of the interactive motion based on the contact position. In some aspects, the mobile robot may also be controlled for the interactive motion based on the force information of the contact.

Step 104 may be implemented by:

controlling the mobile robot to perform a first interactive motion in response to a first tactile pressing operation; and controlling the mobile robot to perform a second interactive motion in response to a second tactile pressing operation.

The first tactile pressing operation and the second tactile pressing operation are of the same type, and the first tactile pressing operation and the second tactile pressing operation obtain different contact positions and/or force information of contacts.

It is to be understood that the first interactive motion and the second interactive motion may be two forms of the same type of interactive motion or may be different types of interactive motion. For example, the first interactive motion and the second interactive motion are both turning motions, and the rotation speed of the mobile robot is determined according to the force information of the contact. As the pressing force of the contact is greater, the rotation speed is higher. For another example, the first interactive motion is the shaking motion, and the second interactive motion is the fluctuating motion.

The tactile pressing operation includes two types: single-point pressing operation and continuous pressing operation, and there are many classes under different types. Reference may be made to the foregoing. The interactive motion includes a moving motion, a shaking motion, and other types. Reference may be made to the foregoing.

For the related description of the interactive motion based on the contact position, reference may be made to the foregoing. The following will describe the interactive motion of the mobile robot controlled based on the force information of the contact.

In an example, the first interactive motion and the second interactive motion are determined according to one of a pressing force, a force direction, and a force angle of the contact.

If the tactile pressing operation is a single-point pressing operation, the mobile robot is controlled to perform interactive motions corresponding to different force information in a case that force information of contacts of the same single-point pressing operation is different. For example, the operator touches the plate close to the backward direction on the sensing device at a single point, and the pressing force of a contact may be obtained according to the touch. According to different pressing pressures, the mobile robot may be controlled to move forward by different distances. Exemplarily, as the value of the pressing force is greater, the moving distance is longer. If the operator touches lightly, the mobile robot is controlled to move by 0.5 meters. If the operator presses heavily, the mobile robot is controlled to move by 1 meter. Exemplarily, the moving distance may also be determined according to the force direction and the force angle of the pressing force. For example, as the force angle is greater, the moving distance is longer.

If the tactile pressing operation is a continuous pressing operation, a pressing force of a contact is obtained according to the continuous pressing operation. The pressing force may be calculated from a pressing force of at least one key point on a moving trajectory formed by continuous touching, such as an average pressing force of a plurality of key points. Alternatively, the pressing force may be calculated from the pressing force of all contacts on the moving trajectory. It is to be understood that at least one key point may be arbitrarily selected or determined according to point selection rules. This disclosure is not limited herein.

For example, the operator draws a horizontal line on the sensing device, and a pressing force of a contact may be calculated according to at least one key point or more key points on the horizontal line. According to different pressing forces, the mobile robot may be controlled to perform different types of interactive motions. For example, the operator draws a horizontal line lightly and controls the mobile robot to shake from side to side. The operator draws a horizontal line heavily and controls the mobile robot to jump up. Exemplarily, different types of the first interactive motion and the second interactive motion may also be determined according to the force direction and the force angle of the pressing force based on actual needs. This disclosure is not limited herein.

It is to be understood that the interactive motion may also be determined based on the contact position and the force information of the contact based on actual needs. This disclosure is not limited herein. At this moment, the types of the first tactile pressing operation and the second tactile pressing operation may be the same or may be different. Related examples may refer to the foregoing and will not be repeated herein.

In some aspects, the tactile pressing operation is a stick figure sketching operation performed on the sensing device that imitates a biological motion state, and the interactive motion is a bionic motion corresponding to the stick figure sketching operation. The bionic motion is a motion that imitates the biological motion state by the mobile robot.

In an example, the bionic motion is a motion that imitates the biological motion state corresponding to the stick figure sketching operation, or the bionic motion is a motion that responds to the biological motion state corresponding to the stick figure sketching operation.

For example, the mobile robot performs a motion with the same or similar motion trajectory as the moving trajectory of the stick figure sketching operation on the sensing device. If the operator draws a horizontal line on the sensing device, the mobile robot shakes from side to side.

For another example, the mobile robot performs a motion in an operation mode indicated by the stick figure sketching operation. If the operator writes a number 3 on the sensing device, the mobile robot performs a motion corresponding to the number 3.

For another example, the mobile robot performs a force feedback motion corresponding to the biological motion state. If the operator presses quickly on the sensing device, the mobile robot makes a shake that imitates being touched by others.

For another example, the mobile robot performs a motion in the same or opposite state of the biological motion state corresponding to the stick figure sketching operation based on a road condition in which the mobile robot is located. If the operator draws a parabola on the sensing device, the mobile robot makes a jump, and the jump height may be determined according to the current road condition.

In conclusion, in the motion control method of the mobile robot provided by this aspect of this disclosure, a tactile pressing operation on a sensing device is received by the sensing device on a base portion, so that a mobile robot implements an interactive motion corresponding to the tactile pressing operation. The sensing device may be regarded as an electronic skin on the base portion, and a novel human-computer interaction method is provided for the mobile robot by the tactile pressing operation on the electronic skin.

During the human-computer interaction, the mobile robot may be controlled to perform different interactive motions according to different tactile pressing operations on the sensing device.

According to the foregoing, the tactile pressing operation may include at least one of the following operations: a single-point pressing operation; and a continuous pressing operation. The interactive motion may include one of the following motions: a moving motion; a steering motion; a shaking motion; a turning motion; a fluctuating motion; and a swinging motion.

The related descriptions of the plurality of tactile pressing operations and the plurality of interactive motions may refer to the foregoing and will not be repeated herein. It is to be understood that the plurality of tactile pressing operations and the plurality of interactive motions given in the foregoing may be combined in other manners. This disclosure is not limited thereto.

Figure 16:
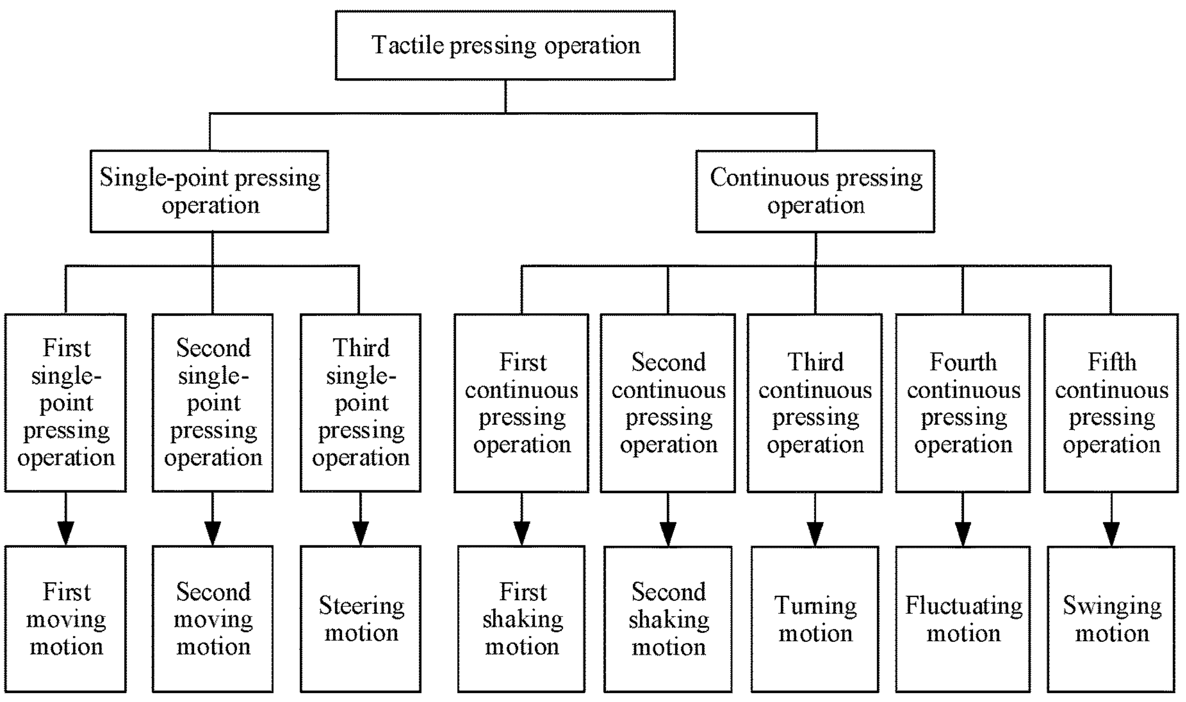
FIG. 16 shows various implementations of tactile pressing operations and interactive motions according to an exemplary aspect of this disclosure.

Exemplarily, FIG. 16 shows various implementations of tactile pressing operations and interactive motions according to an exemplary aspect of this disclosure as follows.

1. Single-Point Pressing Operation

1. The Tactile Pressing Operation Includes a First Single-Point Pressing Operation, and the Interactive Motion Includes a First Moving Motion.

Step 104 may be implemented by:

controlling the mobile robot to move by a first distance in a forward direction in response to a first single-point pressing operation.

According to the foregoing, the first single-point pressing operation is an instant touch on a first plate of the sensing device, and the first plate is a plate on the sensing device away from the forward direction of the mobile robot. For example, the sensing device is divided into six plates, which are in two rows and three columns. The three plates in the first row are close to the forward direction of the mobile robot, and the three plates in the second row are close to the backward direction of the mobile robot. Then, the first plate is a middle plate in the second row.

The first moving motion is used for indicating a motion of the mobile robot moving in the forward direction. A first distance of the mobile robot moving in the forward direction may be set according to actual needs. For example, the first distance is 0.3 meters.

2. The Tactile Pressing Operation Includes a Second Single-Point Pressing Operation, and the Interactive Motion Includes a Second Moving Motion.

Step 104 may be implemented by:

controlling the mobile robot to move by a second distance in a backward direction in response to a second single-point pressing operation;

or, controlling the mobile robot to move by the second distance in the backward direction in response to the second single-point pressing operation, controlling the wheel portion to rotate upon moving by the second distance, and updating the background direction to a forward direction of the mobile robot at a next time.

According to the foregoing, the second single-point pressing operation is an instant touch on a second plate of the sensing device, and the second plate is a plate on the sensing device away from the backward direction of the mobile robot. For example, the sensing device is divided into six plates, which are in two rows and three columns. The three plates in the first row are close to the forward direction of the mobile robot, and the three plates in the second row are close to the backward direction of the mobile robot. Then, the second plate is a middle plate in the first row.

The second moving motion is used for indicating a motion of the mobile robot moving in the backward direction. A second distance of the mobile robot moving in the backward direction may be set according to actual needs. For example, the second distance is 0.3 meters. It is to be understood that the first distance and the second distance may be the same or different.

In some aspects, after the mobile robot moves by the second distance in the backward direction, the mobile robot may also be controlled to rotate by 180 degrees to realize the U-turn of the mobile robot. That is, the backward direction is updated to the forward direction of the mobile robot at a next time.

3. The Tactile Pressing Operation Includes a Third Single-Point Pressing Operation, and the Interactive Motion Includes a Steering Motion.

Step 104 may be implemented by:

controlling the wheel portion to rotate in response to a third single-point pressing operation, to update the forward direction of the mobile robot to a rotation direction, the rotation direction being a direction of a contact position of the third single-point pressing operation relative to a center position of the sensing device.

According to the foregoing, the third single-point pressing operation is an instant touch on a third plate of the sensing device, and the third plate is the remaining plate of the sensing device except the first plate and the second plate. For example, the sensing device is divided into six plates, which are in two rows and three columns. The three plates in the first row are close to the forward direction of the mobile robot, and the three plates in the second row are close to the backward direction of the mobile robot. Then, the first plate is a middle plate in the second row, the second plate is a middle plate in the first row, and third plate is one of the remaining four plates.

The steering motion is rotation of the mobile robot, and a rotation angle does not exceed 180 degrees. The rotation angle of the mobile robot is determined according to the contact position of the third single-point pressing operation on the sensing device.

The center position of the sensing device may be understood as an origin position, or an example of a reference position, of a coordinate system on the sensing device (or the base portion). The coordinate system on the sensing device (or the base portion) is constructed as follows. A rectangular coordinate system is constructed with the base portion as a horizontal plane, and two coordinate axes penetrate through midpoints of four sides of the base portion. A positive axis of an X axis points to the forward direction of the robot.

For example, when the operator presses a point on the sensing device, the contact position may be regarded as a point in the constructed rectangular coordinate system. The point may be represented by coordinates (x, y). Based on this, the contact position is connected with the origin position, and an included angle formed by the connection and the positive axis of the X axis is the rotation direction of the mobile robot in the steering motion.

2. Continuous Pressing Operation

According to the foregoing, the continuous pressing operation includes at least one of the following operations: a first continuous pressing operation, a second continuous pressing operation, a third continuous pressing operation, a fourth continuous pressing operation, and a fifth continuous pressing operation.

The first continuous pressing operation and the second continuous pressing operation are straight lines drawn by the operator on the sensing device. The third continuous pressing operation, the fourth continuous pressing operation, and the fifth continuous pressing operation are different curves drawn by the operator on the sensing device.

The above five continuous pressing operations and the corresponding interactive motions will be described in detail below.

1. The Tactile Pressing Operation Includes a First Continuous Pressing Operation, and the Interactive Motion Includes a First Shaking Motion.

In an example, the first shaking motion is a motion in a shaking direction that is a direction of the wheel portion relative to the base portion.

Step 104 may be implemented by:

controlling the base portion to be inclined in a first direction in response to a first continuous pressing operation; and controlling the wheel portion to alternately change a leg height.

The first direction is a direction of a first initial contact position of the first continuous pressing operation on the sensing device relative to a center position of the sensing device, and an alternate change in the leg height of the wheel portion is determined according to at least two contact positions corresponding to the first continuous pressing operation.

Exemplarily, a pattern corresponding to the first continuous pressing operation is a first straight line, and a direction of the first straight line is a direction perpendicular to the forward direction of the mobile robot.

The first shaking motion is a motion in a shaking direction that is a direction of the wheel portion relative to the base portion. It is also to be understood that the first shaking motion is the mobile robot shaking from side to side.

For example, the sensing device is divided into six plates, which are in two rows and three columns. The three plates in the first row are close to the forward direction of the mobile robot, and the three plates in the second row are close to the backward direction of the mobile robot. The first continuous pressing operation may be performed on the three plates in the first row or on the three plates in the second row.

It is to be understood that the first straight line may be drawn from left to right or from right to left. A starting point position of the first straight line is a first initial contact position of the first continuous pressing operation on the sensing device.

The center position of the sensing device may be understood as an origin position of a coordinate system on the sensing device (or the base portion). The related descriptions may refer to the foregoing. A direction of the first initial contact position relative to the origin position is a first direction.

For example, if the first straight line is drawn from left to right, the first initial contact position is located on the left of the origin position, and the first direction is the left direction of the mobile robot. In the first shaking motion, the base portion is inclined leftward first. For another example, if the first straight line is drawn from right to left, the first initial contact position is located on the right of the origin position, and the first direction is the right direction of the mobile robot. In the first shaking motion, the base portion is inclined rightward first.

The first shaking motion may be realized by alternately lengthening and shortening the legs of the two wheel portions of the mobile robot, that is, by controlling the wheel portions to alternately change the leg height. For example, the first shaking motion may be realized by alternately controlling the leg of the left wheel portion to be shortened and the leg of the right wheel portion to be lengthened, and controlling the leg of the left wheel portion to be lengthened and the leg of the right wheel portion to be shortened at a next time.

An alternate change in the leg height of the wheel portion is determined according to at least two contact positions corresponding to the first continuous pressing operation. The at least two contact positions may be understood as at least two point coordinates in the coordinate system of the first continuous pressing operation on the sensing device (or the base portion).

It is to be understood that the first continuous pressing operation corresponds to a plurality of contact positions. Each contact position can be connected with an origin, and the leg height of the wheel portion at a certain time may be determined according to an included angle between the connection and the positive axis of the X axis. As the included angle is greater, the change in the leg height is greater, and vice versa.

It is to be understood that the alternate change in the leg height of the wheel portion determines the shaking amplitude of the mobile robot. According to the foregoing, the shaking amplitude of the mobile robot is determined according to the first continuous pressing operation.

Exemplarily, the shaking amplitude of the mobile robot is determined according to at least one of the length of the first straight line, the first initial contact position, and the drawing speed of the first straight line. An inclination angle of the base portion is determined according to the length of the first straight line. A direction in which the base portion is inclined first is determined according to the first initial contact position. The shaking speed of the mobile robot is determined according to the drawing speed of the first straight line.

The related description of the shaking amplitude may refer to the foregoing and will not be repeated herein.

The first initial contact position and a first end contact position of the first continuous pressing operation are taken as an example. Assuming that the pattern corresponding to the first continuous pressing operation is a straight line drawn from left to right, a left point coordinate is connected to the origin to obtain a first connecting line, and a right point coordinate is connected to the origin to obtain a second connecting line. According to an included angle between the first connecting line and the second connecting line and the positive axis of the X axis, a limit change value of the leg height of the wheel portion may be determined. The included angle between the first connecting line and the positive axis of the X axis may determine a maximum amplitude of the mobile robot inclined leftward, and the included angle between the second connecting line and the positive axis of the X axis may determine a maximum amplitude of the mobile robot inclined rightward.

If the first straight line is drawn from left to right, the base portion is inclined leftward first during the first shaking motion of the mobile robot. Then, by controlling the legs of the wheel portion on the left and right sides of the mobile robot to be alternately lengthened and shortened, the body shaking of the mobile robot can be realized. The shaking amplitude is determined according to related information of the first straight line.

2. The Tactile Pressing Operation Includes a Second Continuous Pressing Operation, and the Interactive Motion Includes a Second Shaking Motion.

In an example, the second shaking motion is a motion in a shaking direction that is a forward direction or a backward direction of the mobile robot.

Step 104 may be implemented by:

- controlling, in response to a second continuous pressing operation, a first wheel leg support rod of the wheel portion to be shortened and a second wheel leg support rod to be lengthened, so that the base portion is inclined in a second direction; and
- controlling the first wheel leg support rod and the second wheel leg support rod to be alternately lengthened and shortened.

The first wheel leg support rod is a rod in the wheel portion close to a first position, and the second wheel leg support rod is a rod in the wheel portion away from the first position. The first position is a second initial contact position of the second continuous pressing operation on the sensing device, and the second direction is a direction of the second initial contact position relative to a center position of the sensing device. An alternate change in the leg height of the wheel portion is determined according to at least two contact positions corresponding to the second continuous pressing operation.

Exemplarily, a pattern corresponding to the second continuous pressing operation is a second straight line, and a direction of the second straight line is the backward direction of the mobile robot.

The second shaking motion is a motion in a shaking direction that is a forward direction or a backward direction of the mobile robot. It is also to be understood that the second shaking motion is the mobile robot nodding front and back.

For example, the sensing device is divided into six plates, which are in two rows and three columns. The three plates in the first row are close to the forward direction of the mobile robot, and the three plates in the second row are close to the backward direction of the mobile robot. The second continuous pressing operation may be performed on the plates in the three columns.

It is to be understood that the second straight line may be drawn from front to back or drawn from back to front. A starting point position of the second straight line is a second initial contact position of the second continuous pressing operation on the sensing device.

The center position of the sensing device may be understood as an origin position of a coordinate system on the sensing device (or the base portion). The related descriptions may refer to the foregoing. A direction of the second initial contact position relative to the origin position is a second direction.

For example, if the second straight line is drawn from front to back, the first initial contact position is located in the front of the origin position, and the first direction is the forward direction of the mobile robot. In the first shaking motion, the base portion is inclined forward first. For another example, if the second straight line is drawn from back to front, the first initial contact position is located behind the origin position, and the first direction is the backward direction of the mobile robot. In the first shaking motion, the base portion is inclined backward first.

The second shaking motion may be realized by alternately lengthening and shortening two leg support rods on each wheel portion, that is, by controlling the first leg support rod and the second leg support rod of each wheel portion to be alternately lengthened and shortened. For example, each wheel portion includes a wheel leg support rod close to the forward direction and a wheel leg support rod close to the backward direction. The second shaking motion may be realized by alternately controlling the wheel leg support rod close to the forward direction to be shortened and the wheel leg support rod close to the backward direction to be lengthened, and controlling the wheel leg support rod close to the forward direction to be lengthened and the wheel leg support rod close to the backward direction to be shortened at a next time.

In some aspects, the mobile robot is an underactuated system robot.

Referring to FIG. 1, the underactuated system robot is, for example, a wheel-legged robot 10.

Taking a wheel portion 12 on the right side of the wheel-legged robot 10 as an example, the wheel portion 12 includes a thigh unit 121 and a calf unit 122. The thigh unit 121 is composed of two rods, and the calf unit 122 is composed of two rods. The thigh unit 121 and the calf unit located in the forward direction of the wheel-leg robot 10 form a first wheel leg support rod, which is composed of two rods. The thigh unit 121 and the calf unit located in the backward direction of the wheel-leg robot 10 form a second wheel leg support rod, which is composed of two rods.

The alternate lengthening and shortening change of the first wheel leg support rod and the second wheel leg support rod is determined according to at least two contact positions corresponding to the second continuous pressing operation. The at least two contact positions may be understood as at least two point coordinates in the coordinate system of the second continuous pressing operation on the sensing device (or the base portion).

It is to be understood that the second continuous pressing operation corresponds to a plurality of contact positions. Each contact position can be connected with the origin. The lengthening and shortening of the first wheel leg support rod and the second wheel leg support rod at a certain time may be determined according to the length of the connection. As the length is greater, the lengthening and shortening amplitude is greater, and vice versa.

It is to be understood that the alternate lengthening and shortening of the first wheel leg support rod and the second wheel leg support rod determine the shaking amplitude of the mobile robot. According to the foregoing, the shaking amplitude of the mobile robot is determined according to the second continuous pressing operation.

Exemplarily, the shaking amplitude of the mobile robot is determined according to at least one of the length of the second straight line, the second initial contact position, and the drawing speed of the second straight line. An inclination angle of the base portion is determined according to the length of the second straight line. A direction in which the base portion is inclined first is determined according to the second initial contact position. The shaking speed of the mobile robot is determined according to the drawing speed of the second straight line.

The related description of the shaking amplitude may refer to the foregoing and will not be repeated herein.

The second initial contact position and a second end contact position of the second continuous pressing operation are taken as an example. Assuming that the pattern corresponding to the second continuous pressing operation is a straight line drawn from front to back, a front point coordinate is connected to the origin to obtain a first connecting line, and a back point coordinate is connected to the origin to obtain a second connecting line. According to the lengths of the first connecting line and the second connecting line, a limit change value of the leg height of the wheel portion may be determined. The length of the first connecting line may determine a maximum amplitude of the mobile robot inclined forward, and the length of the second connecting line may determine a maximum amplitude of the mobile robot inclined backward.

If the second straight line is drawn from front to back, the mobile robot is inclined forward first during the second shaking motion of the mobile robot. Then, by controlling the first wheel leg support rod and the second wheel leg support rod to be alternately lengthened and shortened, the body shaking of the mobile robot can be realized. The shaking amplitude is determined according to related information of the second straight line.

3. The Tactile Pressing Operation Includes a Third Continuous Pressing Operation, and the Interactive Motion Includes a Turning Motion.

Step 104 may be implemented by:

controlling the wheel portion to rotate by 360 degrees in response to a third continuous pressing operation.

Exemplarily, a pattern corresponding to the third continuous pressing operation is a circle.

According to the foregoing, the turning motion may be understood as positive and negative rotation of the mobile robot, and a rotation angle is 360 degrees. The positive and negative rotation of the mobile robot is determined according to the third continuous pressing operation. For example, if the pattern corresponding to the third continuous pressing operation is a circle drawn clockwise, the mobile robot is controlled to rotate clockwise for a circle. For another example, if the pattern corresponding to the third continuous pressing operation is a circle drawn anticlockwise, the mobile robot is controlled to rotate anticlockwise for a circle.

It is to be understood that after the mobile robot performs the turning motion, the forward direction of the mobile robot remains unchanged. That is, the forward directions of the mobile robot before and after completing the turning motion are consistent.

4. The Tactile Pressing Operation Includes a Fourth Continuous Pressing Operation, and the Interactive Motion Includes a Fluctuating Motion.

Step 104 may be implemented by:

controlling the wheel portion to ascend and then descend vertically in response to a fourth continuous pressing operation until the mobile robot returns to the state before the fourth continuous pressing operation;

or, controlling the wheel portion to descend and then ascend vertically in response to the fourth continuous pressing operation until the mobile robot returns to the state before the fourth continuous pressing operation.

The base portion performs a translational motion during the vertical ascending and descending of the wheel portion.

Exemplarily, a pattern corresponding to the fourth continuous pressing operation is U.

According to the foregoing, the fluctuating motion may be understood as squatting of the mobile robot. The ascending and descending order of the vertical height of the wheel portion is determined according to the fourth continuous pressing operation. For example, if the pattern corresponding to the fourth continuous pressing operation is a U-shaped curve with an opening facing the forward direction, the vertical height of the wheel portion is controlled to descend and then ascend until the height returns to the height before descending. For another example, if the pattern corresponding to the fourth continuous pressing operation is a U-shaped curve with an opening facing the backward direction, the vertical height of the wheel portion is controlled to ascend and then descend until the height returns to the height before ascending.

It is to be understood that after the mobile robot performs the fluctuating motion, the height of the mobile robot remains unchanged. That is, the heights of the mobile robot before and after completing the fluctuating motion are consistent.

5. The Tactile Pressing Operation Includes a Fifth Continuous Pressing Operation, and the Interactive Motion Includes a Swinging Motion.

In an example, the swinging motion is a motion in a swinging direction that is a direction of the wheel portion relative to the base portion.

Step 104 may be implemented by:

controlling the wheel portion to alternately change a leg height with a fixed height in response to a fifth continuous pressing operation, so that a body of the mobile robot is inclined and swung.

Exemplarily, a pattern corresponding to the fifth continuous pressing operation is a heart.

According to the foregoing, the swinging motion is similar to the first shaking motion, which is the mobile robot shaking from side to side. The difference is that the shaking amplitude of the first shaking motion is determined according to the first continuous pressing operation, while the shaking amplitude and/or the shaking speed of the swinging motion are fixed. It is to be understood that during the swinging motion, the wheel portion alternately changes the leg height with a fixed height and/or shaking speed, so that the body of the mobile robot swings at a fixed amplitude and/or a fixed speed.

The initial inclination direction of the body of the mobile robot is determined according to the fifth continuous pressing operation. For example, if the pattern corresponding to the fifth continuous pressing operation is a heart drawn from left to right, the base portion is controlled to be inclined leftward first. For another example, if the pattern corresponding to the fifth continuous pressing operation is a heart drawn from right to left, the base portion is controlled to be inclined rightward first.

In conclusion, the motion control method of the mobile robot provided by this aspect of this disclosure provides a one-to-one correspondence between tactile pressing operations and interactive motions, thereby providing more possibilities of human-computer interaction for a mobile robot, improving the action pattern and flexibility of the mobile robot, and giving operators a human-like experience.

In some aspects, there is a time difference between the interactive motion of the mobile robot and the tactile pressing operation, which are asynchronous. For example, the mobile robot performs a turning motion after a circle drawing operation ends. In other aspects, there is no time difference between the interactive motion of the mobile robot and the tactile pressing operation, which are synchronous. For example, the mobile robot shakes left and right following the operation of drawing horizontal lines by the operator.

It is to be understood that the above correspondence between the plurality of tactile pressing operations and the interactive motions is only an example, and other combinations are within the scope of protection of this disclosure and will not be repeated herein.

In addition, according to the foregoing, under the same type of tactile pressing operations, different interactive motions may be determined according to different contact positions and/or force information of contacts. Taking the third continuous pressing operation as an example, the rotation speed of the mobile robot may be determined according to a pressing force of a contact obtained by the continuous pressing operation. The mobile robot is controlled to perform a turning motion at a first rotation speed in a case of a first pressing force. The mobile robot is controlled to perform a turning motion at a second rotation speed in a case of a second pressing force. The first pressing force is greater than the second pressing force, and the first rotation speed is greater than the second rotation speed.

It is to be understood that the foregoing is only an example. For the same type of tactile pressing operations, the interactive motion performed by the mobile robot may be determined according to at least one of information such as a contact position, a pressing force magnitude of a contact, a force angle of the contact, and a force direction of the contact. Any similar motion control method of a mobile robot and a simple change thereof or the addition of other reference information related to the tactile pressing operation to determine a specific type of interactive motion is within the scope of protection of this disclosure.

According to the foregoing, the tactile pressing operation is a stick figure sketching operation performed by the operator on the sensing device that imitates a biological motion state, and one tactile pressing operation corresponds to a stick figure sketching mode of one biological motion state. It is to be understood that one stick figure sketching operation corresponds to one biological motion state. The following will describe the tactile pressing operation being a stick figure sketching operation on the sensing device that imitates a biological motion state.

Figure 17:
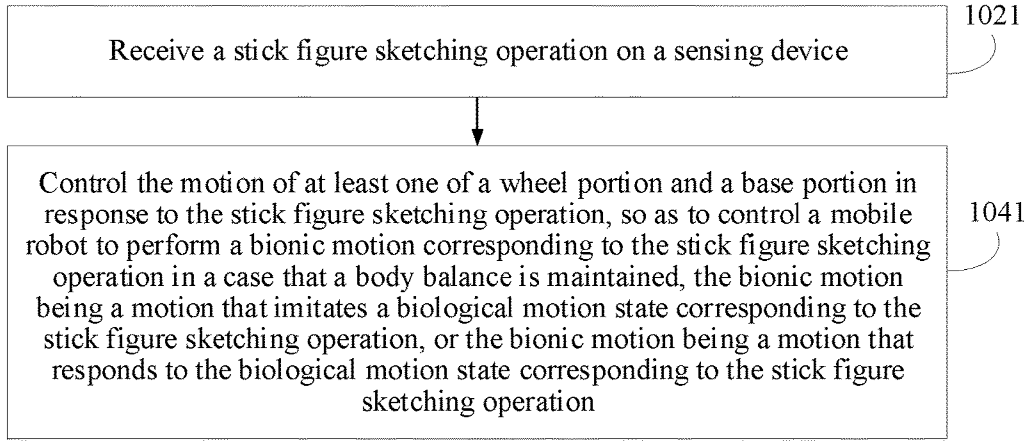
FIG. 17 is a flowchart of a motion control method of a mobile robot according to an exemplary aspect of this disclosure.

Based on FIG. 15, FIG. 17 shows a flowchart of a motion control method of a mobile robot according to an exemplary aspect of this disclosure. Step 102 may be implemented as step 1021 and step 104 may be implemented as step 1041 as follows.

Step 1021: Receive a stick figure sketching operation on the sensing device.

In an example, the stick figure sketching operation is an operation that the operator draws points or lines on the sensing device. For ease of understanding, stick figure sketching may be regarded as a stick figure drawing process performed by the operator on the sensing device, which is used for drawing a pattern corresponding to the biological motion state.

Stick figure sketching modes include at least one of single-point drawing, straight line drawing, and curve drawing, and one stick figure sketching mode corresponds to one biological motion state. It is to be understood that there are several modes to understand the correspondence between the stick figure sketching mode and the biological motion state:

- The stick figure sketching mode is used for indicating the biological motion state, such as drawing a number to indicate the biological motion state corresponding to the number.
- A contact position and/or a line trajectory in the stick figure sketching mode are the same as the biological motion state, such as drawing a circle to indicate the biological motion state of rotation for a circle.

Step 1041: Control the motion of at least one of the wheel portion and the base portion in response to the stick figure sketching operation, to control the mobile robot to perform a bionic motion corresponding to the stick figure sketching operation in a case that a body balance is maintained.

In an example, the bionic motion is a motion that imitates the biological motion state corresponding to the stick figure sketching operation, or the bionic motion is a motion that responds to the biological motion state corresponding to the stick figure sketching operation.

The imitation means that the motion trajectory of the bionic motion is the same as that of the biological motion state. The response means that the motion trajectory of the bionic motion is affected by the biological motion state, and may be a feedback to the biological motion state, a motion determined after considering the road conditions, and a motion state opposite to the biological motion state.

In an example, in a case that the bionic motion is a motion that imitates the biological motion state corresponding to the stick figure sketching operation, step 1041 may be implemented as follows.

In response to the stick figure sketching operation, the mobile robot is controlled to perform a motion with the same motion trajectory as a moving trajectory of the stick figure sketching operation on the sensing device while maintaining the body balance.

It is to be understood that a stick figure sketching mode can be determined based on the stick figure sketching operation, to determine the corresponding biological motion state. Then, if the mode of imitating the biological motion state is adopted, the mobile robot is controlled to perform a motion with the same motion trajectory as the moving trajectory of the stick figure sketching operation on the sensing device.

For example, a vertical line is drawn from front to back on the sensing device.

In an implementation scenario, the biological motion state may be determined as a nodding state, and then the mobile robot may be controlled to perform a shaking motion according to information such as the length of the vertical line, the drawing speed, and the initial contact position, so that the mobile robot presents a humanoid motion state of nodding.

In another implementation scenario, the biological motion state may be determined as a backward state, and then the mobile robot may be controlled to move backward by a certain distance, so that the mobile robot presents a humanoid motion state of one step back.

In an example, in a case that the bionic motion is a motion that responds to the biological motion state corresponding to the stick figure sketching operation, step 1041 may be implemented by:

controlling, in response to the stick figure sketching operation, the mobile robot to perform a motion in an operation mode indicated by the stick figure sketching operation while maintaining the body balance;

or, controlling, in response to the stick figure sketching operation, the mobile robot to perform a force feedback motion of the biological motion state corresponding to the stick figure sketching operation while maintaining the body balance;

or, controlling, in response to the stick figure sketching operation, the mobile robot to perform a motion in the same or opposite state of the biological motion state corresponding to the stick figure sketching operation based on the environmental information of the mobile robot while maintaining the body balance. The environmental information is used for indicating road condition information corresponding to the mobile robot, information of surrounding obstacles, climate, and other information.

It is to be understood that a stick figure sketching mode can be determined based on the stick figure sketching operation, to determine the corresponding biological motion state. Then, if the mode of responding to the biological motion state is adopted, the mobile robot may be controlled to perform different bionic motions based on the biological motion state.

Exemplarily, the bionic motion may be a motion indicated by the stick figure sketching mode. For example, the operator writes a number 3 on the sensing device, and the mobile robot is controlled to perform a motion corresponding to the number 3.

Exemplarily, the bionic motion may also be a feedback to the biological motion state. For example, the operator passes quickly on the sensing device, and the mobile robot makes a shake that imitates being touched by others.

Exemplarily, the bionic motion may also be a motion determined in consideration of the environmental information, and the motion may be the same as or opposite to the biological motion state. For example, the operator draws a parabola on the sensing device, and the mobile robot makes a jumping action. The jump height may be determined according to the current environmental information.

The environmental information of the mobile robot may be determined in one of the following modes: calling map information of a location of the mobile robot, acquiring a visual signal of the mobile robot, and performing simultaneous localization and mapping (SLAM) according to a historical moving path of the mobile robot. For example, the mobile robot may request for map information to call the existing map. For another example, the mobile robot acquires a visual signal through a sensing device such as a lidar and/or a camera to determine the current environmental information of the mobile robot. For another example, based on a historical moving path in which the mobile robot has traveled, a map of the current environment is built to obtain the current environment information of the mobile robot.

In an example, the body balance of the mobile robot is maintained through the control of a whole body dynamics model of the mobile robot. The whole body dynamics model of the mobile robot will be described below.

In conclusion, in the motion control method of the mobile robot provided by this aspect of this disclosure, the type of the tactile pressing operation is further limited, and the mobile robot is controlled to perform a bionic motion based on the stick figure sketching operation.

In an example, the bionic motion may be a motion that imitates the biological motion state corresponding to the stick figure sketching operation, or a motion that responds to the biological motion state corresponding to the stick figure sketching operation. Based on the various implementations, the types of interactive motions of the mobile robot can be further enriched, and the flexibility of the mobile robot can be improved.

Figures 18, 19:
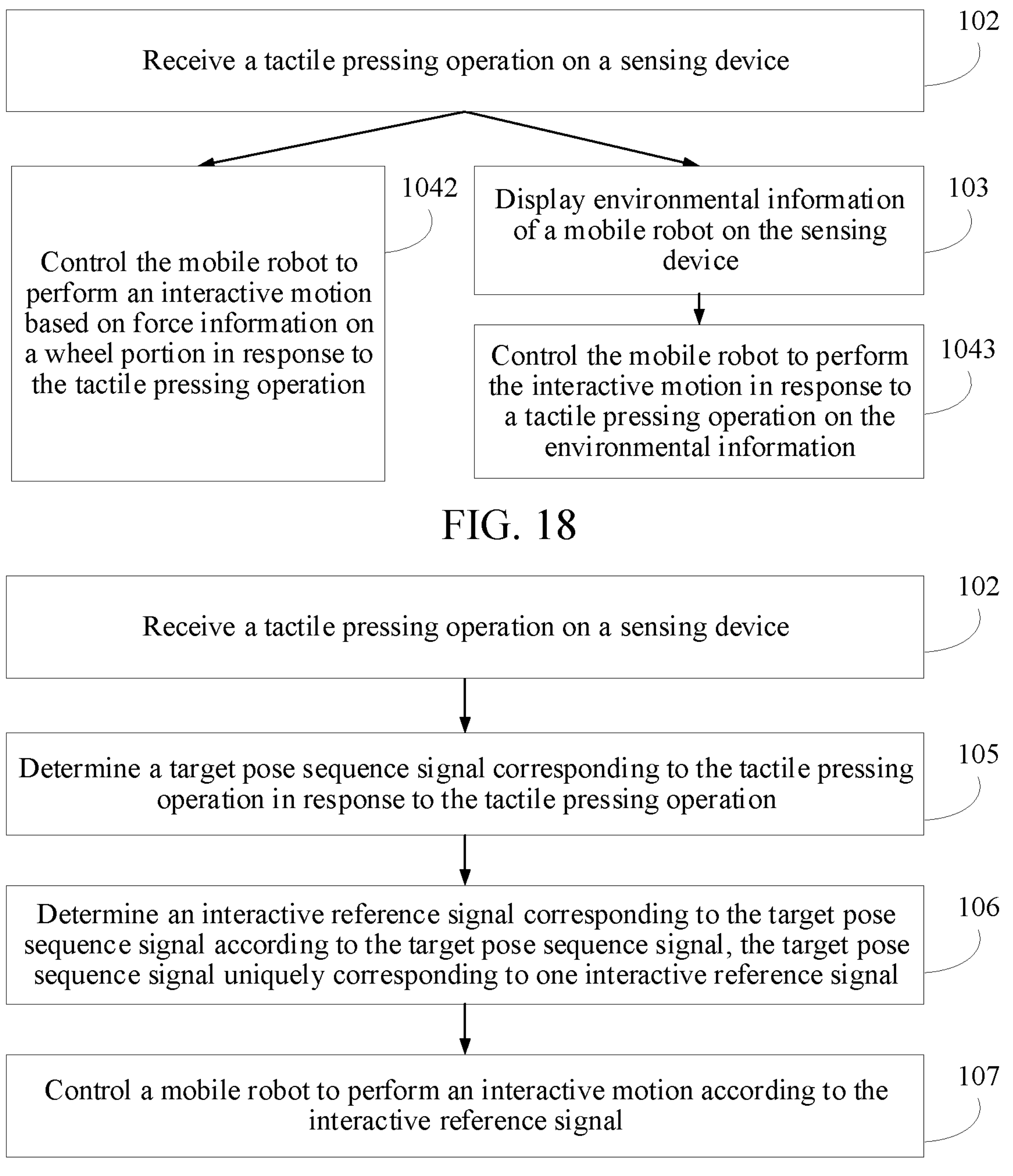
FIG. 18 is a flowchart of a motion control method of a mobile robot according to an exemplary aspect of this disclosure.
FIG. 19 is a flowchart of a motion control method of a mobile robot according to an exemplary aspect of this disclosure.

Based on FIG. 15, FIG. 18 shows a flowchart of a motion control method of a mobile robot according to an exemplary aspect of this disclosure. Step 104 may be implemented as step 1042 or step 1043. The motion control method of the mobile robot provided by this aspect of this disclosure further includes step 103. Step 1042 and step 103 are alternatively performed as follows.

Step 1042: Control the mobile robot to perform an interactive motion based on force information on the wheel portion in response to the tactile pressing operation.

The force information is used for indicating at least one of a force magnitude, a force direction, and a force angle on the wheel portion.

In some aspects, the wheel portion may also be covered with the sensing device to enable the interactive motion of the wheel portion of the mobile robot. For example, the sensing device is provided outside joint positions of the thigh unit and the calf unit of the wheel portion, the operator continuously presses the sensing device to control the mobile robot to make a sideways action, and the sideways direction is consistent with the pressing direction of the operator.

In an example, a first sensing device is provided outside a position where the wheel portion is connected to the base portion, a second sensing device is provided outside a joint position of the wheel portion, and a third sensing device is provided outside a wheel of the wheel portion. The motion control method of the mobile robot provided by this aspect of this disclosure further includes the following steps.

Force information on at least one of the first sensing device, the second sensing device, and the third sensing device is acquired.

The mobile robot is controlled to perform an interactive motion for the wheel portion according to the force information.

The interactive motion for the wheel portion is used for indicating a motion such as movement and inclination of the wheel portion, and the control of the base portion is not involved in this interactive motion. The base portion may passively adjust pose based on a connection relationship with the wheel portion, so that the mobile robot maintains the body balance.

It is to be understood that the interactive motion for the wheel portion belongs to one of the interactive motions of the mobile robot. At the same time, the mobile robot performs an interactive motion for the wheel portion or an interactive motion corresponding to the tactile pressing operation, both of which cannot be performed simultaneously.

In some aspects, after obtaining the force information, the mobile robot may be controlled to perform the interactive motion corresponding to the tactile pressing operation based on the tactile pressing operation and considering the force information, and the interactive motion may fully consider the force situation of the wheel portion to ensure the balance control of the mobile robot.

For example, the operator draws a circle on the sensing device arranged on the base portion, the second sensing device at the joint position of the left wheel portion obtains resistance information, and the mobile robot may be controlled to perform a turning motion based on the resistance information. It is to be understood that during the turning motion, the wheel portion will no longer rotate by 360 degrees, and the rotation angle is determined based on the resistance information to avoid the mobile robot rolling over due to the resistance of the joint position of the left wheel portion.

Step 103: Display environmental information of the mobile robot on the sensing device.

In an example, the environmental information is used for indicating road condition information corresponding to the mobile robot, information of surrounding obstacles, climate, and other information. The environmental information may be determined in one of the following modes:

Call map information of a location of the mobile robot.

The mobile robot may request an external device (such as a controller) for map information to call the existing map for use.

Acquire a visual signal of the mobile robot.

A sensing device such as a lidar and/or a camera is arranged on the mobile robot. Based on the information collection, analysis, and processing of the sensing device, the current environmental information of the mobile robot is determined based on the visual signal of the mobile robot.

Perform SLAM according to a historical moving path of the mobile robot.

The SLAM may be described as: The robot moves from an unknown position in an unknown environment, is located according to the position and map during the movement, and builds an incremental map on the basis of self-localization, to realize autonomous localization and navigation of the robot. That is, the mobile robot has a mapping function. Based on a historical moving path in which the mobile robot has traveled, a map of the current environment may be built to obtain the current environment information of the mobile robot.

After determining the environmental information, the environmental information may be visually displayed to the operator. For example, the environmental information is displayed on the sensing device in the form of thumbnails, and the operator may perform the tactile pressing operation on the environmental information to control the mobile robot to perform an interactive motion.

Step 1043: Control the mobile robot to perform the interactive motion in response to a tactile pressing operation on the environmental information.

Similar to step 1042, after determining the environmental information of the mobile robot, the mobile robot may be controlled to perform the interactive motion by the tactile pressing operation on the environmental information.

For example, by calling the map information of the location of the mobile robot, the thumbnail of the current environment information of the mobile robot is displayed on the sensing device. The operator draws a line on the displayed map to control the mobile robot to move according to a trajectory of the drawn line until the mobile robot moves to a position corresponding to an end point of the line.

For another example, the thumbnail of the environmental information in the forward direction of the mobile robot is displayed on the sensing device by the sensing device such as the lidar and/or the camera. The operator draws a line on the displayed road condition to control the mobile robot to move according to a trajectory of the drawn line until the mobile robot moves to a position corresponding to an end point of the line.

In an example, if there are obstacles at the end point of the line, the mobile robot may be controlled to perform an interactive motion such as crossing obstacles and picking up. For example, if the end point of the line is a cup, the mobile robot may be controlled to travel to the front of the cup and clamp the cup through a manipulator installed on the mobile robot.

It is to be understood that steps 1042 and 1043 may be implemented in combination. Exemplarily, step 104 may also be implemented by: controlling, in response to the tactile pressing operation, the mobile robot to perform an interactive motion based on the force information on the wheel portion and/or a road condition in which the mobile robot is located.

The related description of the force information on the wheel portion and/or the road condition in which the mobile robot is located may refer to the foregoing and will not be repeated herein.

In conclusion, in the motion control method of the mobile robot provided by this aspect of this disclosure, the implementation that the sensing device covers the key position of the wheel portion is provided, thereby providing a novel interactive mode for the wheel portion of the mobile robot.

In an example, the mobile robot may also be controlled to realize the interactive motion corresponding to the tactile pressing operation based on at least one sensing device covered on the key position of the wheel portion and/or the environmental information of the mobile robot, so that the mobile robot has higher flexibility and higher control accuracy, and more possibilities are provided for the interactive motion of the mobile robot.

It is to be understood that aspects of the interactive motion given in the foregoing may be implemented in combination, and any one of the combined implementations is within the scope of protection of this disclosure and will not be repeated herein.

Based on FIG. 15, FIG. 19 is a flowchart of a motion control method of a mobile robot according to an exemplary aspect of this disclosure. Step 104 may be implemented as step 105, step 106, and step 107 as follows.

Step 105: Determine a target pose sequence signal corresponding to the tactile pressing operation in response to the tactile pressing operation.

The related descriptions of the tactile pressing operation may refer to the foregoing and will not be repeated herein.

In an example, the target pose sequence signal is used for describing physical information and force information of the tactile pressing operation. Based on the sensing device arranged on the base portion, when the operator presses at a single point, a straight line, or a curve on the sensing device, the target pose sequence signal corresponding to the tactile pressing operation can be obtained based on touch detection on the sensing device.

In an example, the target pose sequence signal includes at least one of the following information:

- contact coordinate of at least one contact point on the sensing device;
- contact angle of the at least one contact point;
- plate identifier of a plate where the at least one contact point is located, the sensing device being partitioned to obtain more than two plates; and
- force information of the at least one contact point, the force information including at least one of a force magnitude, a force direction, and a force angle.

It is to be understood that the at least one contact point is at least one contact pressed on the sensing device by the tactile pressing operation. In addition, the expressions related to "contacts" in the foregoing may be understood as contact points.

In order to realize touch detection on the sensing device, the sensing device may be partitioned to obtain more than two plates, and the target pose sequence signal may be obtained through detection on each plate. After the sensing device is partitioned, more than two plates may be sequentially numbered, and the plate identifier of the plate where the at least one contact point is located is used for indicating numbering information of the plate where the at least one contact point is located.

The partitioning of the sensing device may be set according to actual needs, and the sensing device may be divided into six plates according to the eight interactive motions exemplified in the foregoing. It is to be understood that the increased correspondence between the tactile pressing operation and the interactive motion may divide a touch pad into more plates. For example, there are n tactile pressing operations corresponding to n interactive motions, and it is determined that the touch pad is divided into m plates according to recognition needs of the n tactile pressing operations. It is to be understood that each of the n tactile pressing operations is recognized by signal analysis on at least m plates.

The contact coordinate and contact angle of the at least one contact point may be determined by a coordinate system on the sensing device (or the base portion). Exemplarily, the coordinate system on the sensing device (or the base portion) is constructed as follows. A rectangular coordinate system is constructed with the base portion as a horizontal plane, and two coordinate axes penetrate through midpoints of four sides of the base portion. The positive axis of the X axis points to the forward direction of the robot.

The at least one contact point is a point on the constructed rectangular coordinate system, and the contact coordinate of the point may be represented by coordinates (x, y). The contact angle may be determined in the following mode: connecting the contact position with the origin position, where an included angle formed by the connection and the positive axis of the X axis is the contact angle.

Based on the touch detection on the sensing device, the force information of the at least one contact point may also be obtained. The force information includes at least one of a force magnitude, a force direction, and a force angle.

In an example, step 105 may be implemented by:

performing, in response to the tactile pressing operation, single-point signal analysis or continuous multi-point signal analysis through the sensing device to determine the target pose sequence signal.

Figures 20, 21:
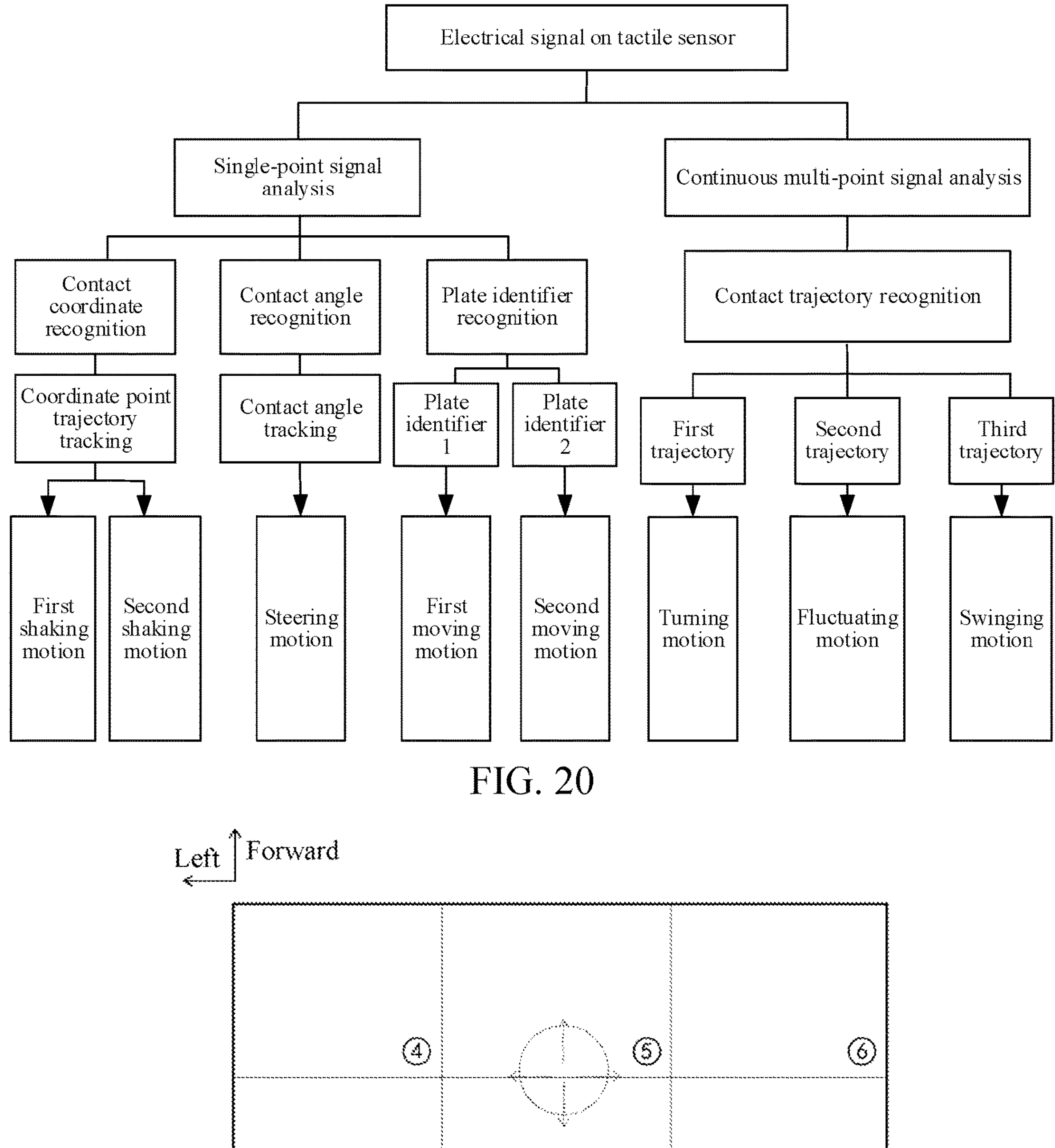
FIG. 20 is a schematic diagram of various signal analysis modes according to an exemplary aspect of this disclosure.
FIG. 21 is a schematic diagram of a touch detection mode according to an exemplary aspect of this disclosure.

FIG. 20 shows a schematic diagram of various signal analysis modes according to an exemplary aspect of this disclosure.

After receiving an electrical signal on the sensing device, single-point signal analysis or continuous multi-point signal analysis may be performed.

The single-point signal analysis includes at least one of contact coordinate recognition, contact angle recognition, and plate identifier recognition. The continuous multi-point signal analysis includes contact trajectory recognition.

The contact coordinate recognition is used for recognizing the contact coordinate of the at least one contact point. The contact angle recognition is used for recognizing the contact angle of at the least one contact point. The plate identifier recognition is used for recognizing the plate identifier of the plate where the at least one contact point is located. The contact trajectory recognition is used for recognizing a moving trajectory formed by the tactile pressing operation on the sensing device.

In the single-point signal analysis, coordinate point trajectory detection may be performed according to the contact coordinate recognition, thereby determining whether the tactile pressing operation is a first continuous pressing operation or a second continuous pressing operation, to control the mobile robot to perform a first shaking motion or a second shaking motion. According to the contact angle recognition, contact angle detection may be performed, thereby determining that the tactile pressing operation is a third single-point pressing operation, to control the mobile robot to perform a steering motion. According to the plate identifier recognition, the plate identifier corresponding to the plate where the contact point is located may be determined, so that the tactile pressing operation is determined as a first single-point pressing operation according to plate identifier 1, and the tactile pressing operation is determined as a second single-point pressing operation according to plate identifier 2, to control the mobile robot to perform a first moving motion or a second moving motion.

In the continuous multi-point signal analysis, the trajectory of the contact may be determined as one of a first trajectory, a second trajectory, and a third trajectory according to the contact trajectory recognition, thereby determining whether the tactile pressing operation is one of a third continuous pressing operation, a fourth continuous pressing operation, and a fifth continuous pressing operation, to control the mobile robot to perform one of a turning motion, a fluctuating motion, and a swing motion. The first trajectory, the second trajectory, and the third trajectory may be set according to actual needs.

Compared with the single-point signal analysis, the continuous multi-point signal analysis also includes a step of key frame recognition, and a specific type of the trajectory is determined through the key points in the contact trajectory. The key frame recognition may be performed by the order of plate identifiers. For example, the specific type of the trajectory is determined based on the order of plate identifiers and the information of the key points on each plate. The key points on each plate may be selected arbitrarily, or the key points on each plate may be determined according to point selection rules.

It is to be understood that FIG. 20 is only an example of the foregoing plurality of exemplary aspects. Correspondences between other tactile pressing operations and interactive motions may be adopted, in which case the signal analysis for the sensing device is similar thereto and may be described with reference thereto.

According to the foregoing, the target pose sequence signal may be acquired through touch detection on the sensing device. In an example, the touch detection on the sensing device includes single-point touch detection and multi-point touch detection, and the above two touch detection modes may also be subdivided into various detection modes. Exemplary descriptions of various touch detection modes on the sensing device will be given below:

1. Single-Point Touch Detection

Figure 22:
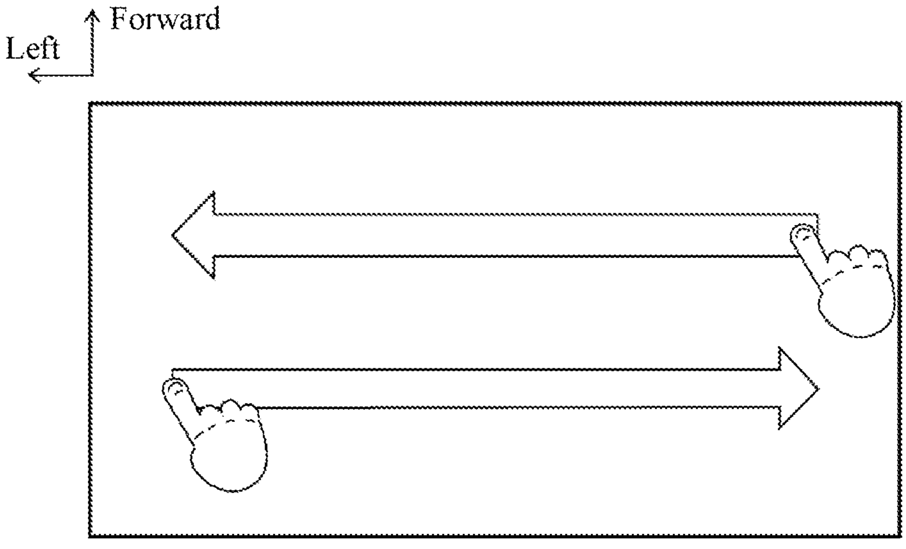
FIG. 22 is a schematic diagram of a touch detection mode according to an exemplary aspect of this disclosure.

In an example, the single-point touch operation includes single-point single-touch detection and unordered continuous single-point touch detection. FIG. 21 shows a schematic diagram of single-point single-touch detection according to an exemplary aspect of this disclosure. FIG. 22 shows a schematic diagram of unordered continuous single-point touch detection according to an exemplary aspect of this disclosure.

Referring to FIG. 21, the sensing device is divided into six plates, which are in two rows and three columns. The three plates in the first row are close to the forward direction of the mobile robot, and the three plates in the second row are close to the backward direction of the mobile robot. Six plates are orderly marked as six regions from (1) to (6), and the origin position on the sensing device is a midpoint of an edge where plate (2) and plate (5) are connected.

Referring to FIG. 21, in the single-point single-touch detection, the obtained feedback information includes at least: plate identifiers and a contact angle.

In an example, if the plate identifier is (2), the mobile robot is controlled to move by a first distance in the forward direction. If the plate identifier is (5), the mobile robot is controlled to move by a second distance in the backward direction. If the plate identifier is one of (1), (3), (4), and (6), the mobile robot is controlled to perform a steering motion, and the forward direction of the mobile robot is determined as the direction where the contact point is relative to the origin position on the sensing device.

Referring to FIG. 22, in the unordered continuous single-point touch detection, the obtained feedback information includes at least: contact coordinates of at least two contacts.

In an example, if the contact coordinates of the at least two contacts are used for indicating that the tactile pressing operation is a continuous touch from left to right on the sensing device, the base portion is controlled to be inclined leftward first, and then the mobile robot performs a first shaking motion. If the contact coordinates of the at least two contacts are used for indicating that the tactile pressing operation is a continuous touch from right to left on the sensing device, the base portion is controlled to be inclined rightward first, and then the mobile robot performs a first shaking motion.

Similarly, if the contact coordinates of the at least two contacts are used for indicating that the tactile pressing operation is a continuous touch from front to back on the sensing device, the base portion is controlled to be inclined forward first, and then the mobile robot performs a second shaking motion. If the contact coordinates of the at least two contacts are used for indicating that the tactile pressing operation is a continuous touch from back to front on the sensing device, the base portion is controlled to be inclined backward first, and then the mobile robot performs a first shaking motion.

It is to be understood that the single-point touch detection is for realizing single-point signal analysis, and the detection result is used for realizing at least one of contact coordinate recognition, contact angle recognition, and plate identifier recognition.

2. Multi-Point Touch Detection

Figure 23:
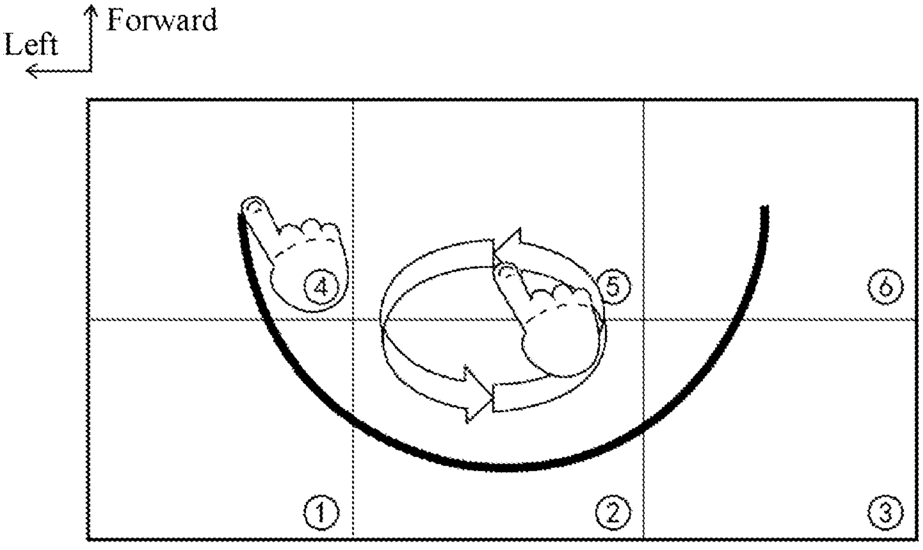
FIG. 23 is a schematic diagram of a touch detection mode according to an exemplary aspect of this disclosure.
Figure 24:
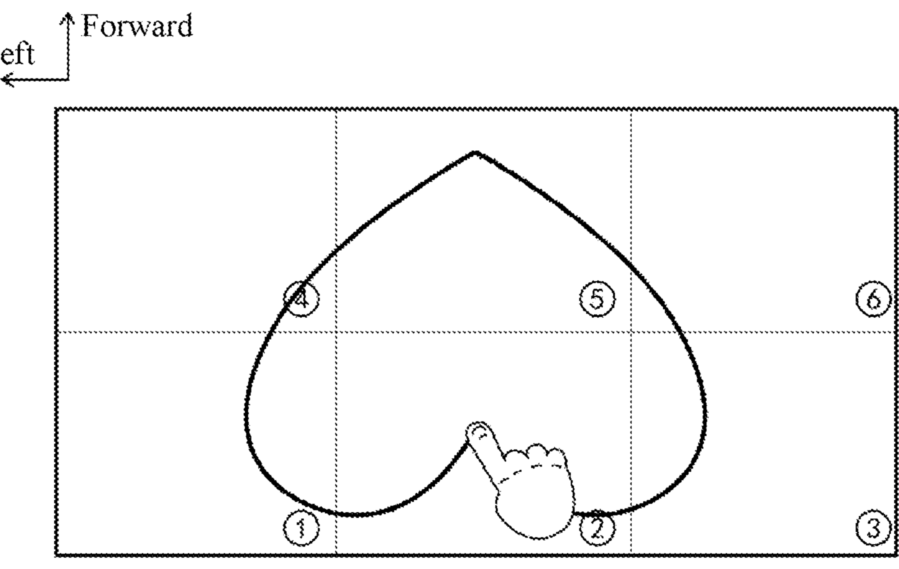
FIG. 24 is a schematic diagram of a touch detection mode according to an exemplary aspect of this disclosure.

Exemplarily, the multi-point touch operation includes sequential multi-point touch detection and sequential multi-point continuous touch detection. FIG. 23 shows a schematic diagram of sequential multi-point touch detection according to an aspect of this disclosure. FIG. 24 shows a schematic diagram of sequential multi-point continuous touch detection according to an aspect of this disclosure.

Similar to FIG. 21, in FIG. 23 and FIG. 24, the sensing device is still divided into six plates, the six plates are orderly marked as six regions from (1) to (6), and the origin position on the sensing device is a midpoint of an edge where plate (2) and plate (5) are connected.

Referring to FIG. 23, in the sequential multi-point touch detection, the obtained feedback information includes at least: plate identifiers and contact angles of at least two contacts.

In an example, if the order of plate identifiers is (4) (1) (2) (3) (6) or (6) (3) (2) (1) (4), the height of the mobile robot is controlled to decrease first and then increase until the mobile robot returns to the original height. If the order of plate identifiers is (1) (4) (5) (6) (3) or (3) (6) (5) (4) (1), the height of the mobile robot is controlled to increase first and then decrease until the mobile robot returns to the original height. If the order of plate identifiers is (5) (2) (5) (2), the mobile robot is controlled to rotate clockwise for a circle. If the order of plate identifiers is (2) (5) (2) (5), the mobile robot is controlled to rotate anticlockwise for a circle.

Referring to FIG. 24, in the sequential multi-point continuous touch detection, the obtained feedback information includes at least: plate identifiers and contact angles of at least two contacts.

Exemplarily, if the order of plate identifiers is (2) (3) (6) (5) (4) (1), the body of the mobile robot is controlled to swing with a fixed amplitude and/or a fixed speed, and the base portion is inclined rightward first. If the order of plate identifiers is (1) (4) (5) (6) (3) (2), the body of the mobile robot is controlled to swing with a fixed amplitude and/or a fixed speed, and the base portion is inclined leftward first.

It is to be understood that the multi-point touch detection is for realizing continuous multi-point signal analysis, and the detection result is used for realizing the contact trajectory recognition. The multi-point touch detection includes the process of key frame recognition. After determining the order of plate identifiers, a specific type of the tactile pressing operation on the sensing device can be determined in contrast to preset sequence information and in combination with the information of the key points on each plate, so that the mobile robot can realize the corresponding interactive motion.

The above aspects are only examples and are not intended to limit this disclosure.

It is to be understood that other interactive motions of the mobile robot may also be controlled based on other feedback information, and these correspondences are within the scope of protection of this disclosure. For example, in the sequential multi-point continuous touch detection, if the order of plate identifiers is (5) (2), the mobile robot is controlled to move forward for 2 seconds. If the order of plate identifiers is (2) (5), the mobile robot is controlled to move backward for 2 seconds.

In some aspects, based on the four touch detection modes given above, force information of at least one contact point may be obtained, including at least one of a force magnitude, a force direction, and a force angle of the at least one contact point.

In an aspect, contact position coordinate transformation may be performed on the obtained feedback information through the contact position and/or force information of the at least one contact point to determine corresponding state information. The contact position coordinate transformation is a process that transforms the position information and/or force information of the contact position into the state information.

In an aspect, the position information and/or force information of the contact position may be obtained by the sensing device, and a correspondence between a force signal changing unit and the position of a pressure sensor array on the upper surface of the base portion may be described by the contact position coordinate transformation. The relationship between the position of the upper surface of the base portion and the center of mass of the mobile robot is known, a contact point between the upper surface of the base portion and a load object may be obtained by coordinate conversion, and a positional relationship between the load object and the center of mass may be obtained.

According to the foregoing, the sensing device includes a pressure sensor array arranged in an m×n matrix. The length and width of the m×n matrix are adapted to the upper surface of the base portion, where m and n are positive integers.

When the corresponding pressure unit is pressed, a pressure value thereof will change. Each unit may output a corresponding pressure value, while the pressure value on the unpressed unit is 0 or a very small noise value. Therefore, it is necessary to filter out these small noises. This process may be regarded as a signal conditioning process.

In some aspects, the signal conditioning includes, but is not limited to, using at least one of the following modes: averaging, force distributing, and threshold filtering.

The averaging means that the pressure values in a certain range (such as a 4*4 dot matrix or a plurality of points in a circular region) are averaged, and the contact point between the load object and the mobile robot is considered to be at the center of a plurality of contact points. The force distributing means that the pressure values in a certain range are expressed in the form of distribution, and the force value may be integrated to obtain force magnitude and position distribution, to determine the state of the load object. The threshold filtering means that because the pressure sensor has a certain probability of false detection, some noises may be detected without force. Accordingly, a threshold is set. When the detected pressure value is below the threshold, it is considered that the sensor is not triggered.

After the signal conditioning, the force information of at least one contact point may be obtained.

It is to be understood that the above is a simple example of the signal conditioning process and is not limited in this disclosure.

Step 106: Determine an interactive reference signal corresponding to the target pose sequence signal according to the target pose sequence signal.

In an example, the target pose sequence signal uniquely corresponds to one interactive reference signal.

After determining the target pose sequence signal, the interactive reference signal corresponding to the target pose sequence signal may be uniquely determined according to a preset correspondence. For example, the interactive reference signal is used for indicating a control signal corresponding to the interactive motion of the mobile robot, and at least includes information such as a joint moment, a joint angle, a joint angular velocity, a joint angular acceleration, an inclination angle of the base portion, and the like.

The correspondence between the target pose sequence signal and the interactive reference signal may be set in advance according to actual needs. For example, if the pattern corresponding to the tactile pressing operation determined by the target pose sequence signal is a U-shaped curve, the interactive reference signal is determined to be a signal corresponding to the fluctuating motion.

Step 107: Control the mobile robot to perform the interactive motion according to the interactive reference signal.

During the interactive motion of the mobile robot, the whole body dynamics control of the mobile robot may be realized through a whole body dynamics model.

Step 107 may be implemented by:

- determining moment information of the base portion and/or the wheel portion by taking the interactive reference signal and a whole body dynamics model of the mobile robot as inputs of a closed-loop PID controller; and
- controlling the mobile robot to perform the interactive motion according to the moment information.

In some aspects, the mobile robot is an underactuated system robot. The following describes the control of the whole body dynamics model of the underactuated system robot.

Taking the realization of the whole body dynamics control by a balance controller as an example, an interactive reference signal is inputted to the balance controller of the underactuated system robot, and a generated control reference signal of the whole body dynamics control is outputted by the corresponding whole body dynamics model to drive at least one of the base portion and the wheel portion.

The control reference signal includes, but is not limited to, at least one of the following signals: a reference signal of wheel rotation, a reference signal of a base portion pose, and a reference signal of a tail portion pose. The balance controller outputs moment information of each joint, and the motion of the base portion and/or the wheel portion may be determined according to the determined moment information.

In an example, the balance controller is a PID controller.

It is to be understood that the whole body dynamics model may be determined according to a Lagrange equation or a Newton-Euler equation, or the whole body dynamics model may be determined according to other modes. The following is an example only and is not limited in this disclosure.

The whole body dynamics model may be constructed based on a drive torque, a ground friction, and a closed-loop force of the underactuated system robot.

For example, $\tau$ represents the drive torque of the underactuated system robot, f represents the ground friction, and $\lambda$ represents the closed-loop force. The whole body dynamics model of the underactuated system robot may be represented as follows:

$$M(q)\ddot{q} + C(q, \dot{q}) = S^T\tau + J_f^T f + J_\lambda^T \lambda,$$

where q is a generalized joint angle coordinate of the underactuated system robot, which may be represented as $$q=\left[q_{fb}^T,\ q_J^T\right]^T,$$

including the pose of the base portion, the number of joint angles, and joint angles.

$$q_{fb}^T\in R^3\times \mathrm{SO}(3)$$

represents the pose of the base portion, $n_j$ represents the number of joint angles, and $$q_J^T=\left[q_1,\ q_2,\ \ldots\ ,\ q_{n_j}\right]^T$$

represents the joint angles.

$$\dot{q}=\left[\dot{q}_{fb}^T,\ \dot{q}_J^T\right]^T$$

is a generalized joint speed, and $$\ddot{q}=\left[\ddot{q}_{fb}^T,\ \ddot{q}_J^T\right]^T$$

is a generalized joint acceleration. $M(q)\in\mathbb{R}^{(6+n_j)\times(6+n_j)}$ is a mass matrix, $C(q,\dot{q})\in\mathbb{R}^{(6+n_j)}$ is composed of gravity, centrifugal force, and Coriolis term, $S=[0_{n_j\times 6}\ I_{n_j\times n_j}]$ is a matrix of drive joints selected from all joints, f is a ground contact force, $J_f\in\mathbb{R}^{3n_c\times(n_j+6)}$ is a cascade contact Jacobian matrix, and $J\lambda\in\mathbb{R}^{3n_\lambda\times(n_j+6)}$ is a contact Jacobian matrix used by a closed-loop link connection constraint. $n_c$ is the number of contact points between the wheel and the ground, and $n_\lambda=2$ is the number of contact points between open-loop links considering the closed-loop constraint of a five-link mechanism, that is, between $P_1$ and $P_2$ in FIG. 25.

Figure 25:
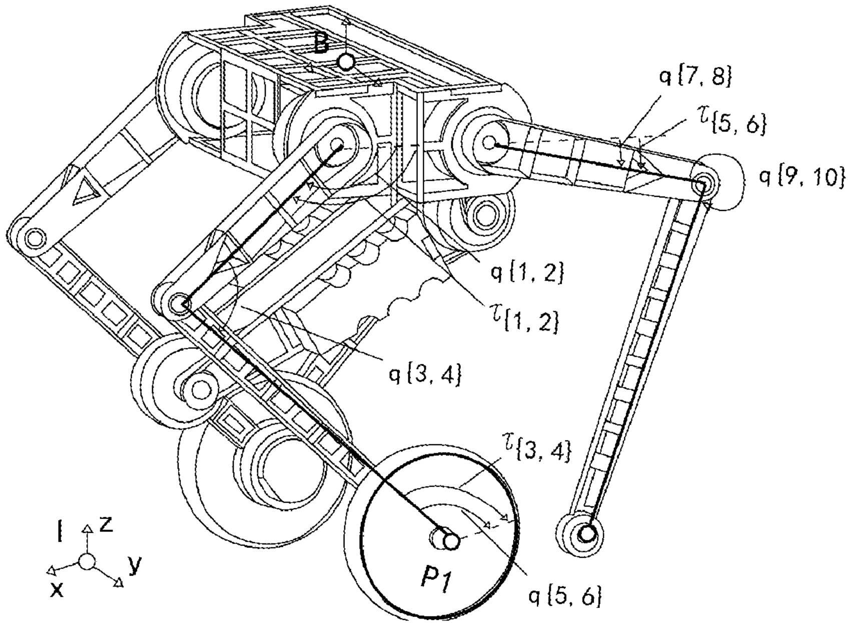
FIG. 25 is a schematic diagram of a generalized coordinate of a mobile robot according to an exemplary aspect of this disclosure.

FIG. 25 shows a schematic diagram of a generalized coordinate of a mobile robot according to an exemplary aspect of this disclosure. The mobile robot is an underactuated system robot. The joint angle $q_i$ and the drive torque $\tau_i$ are marked around the joint. Double subscripts of $q_{\{\cdot,\cdot\}}$ and $\tau_{\{\cdot,\cdot\}}$ consider joint indexes of left and right legs respectively. Only connections and joints on the left leg are marked in FIG. 25, and the right leg is symmetrical with the left leg for reference. In addition, for clarity, the two joint angles $q_{11}$ and $q_{12}$ of the tail portion and the drive torques $\tau_7$ and $\tau_8$ are omitted in FIG. 25.

According to the whole body dynamics model $$M(q)\ddot{q}+C(q,\dot{q})=S^T\tau+J_f^Tf+J_\lambda^T\lambda$$

of the underactuated system robot, the control reference signals of the wheel portion and/or the base portion, such as moment information, may be determined.

The control reference signals of the wheel portion and/or the base portion may be determined by determining variable values of the drive torque τ, the ground friction force f, and the closed-loop force λ such that the whole body dynamics model is minimized by an argmin function. The argmin function may be represented as follows:

$$\underset{(\tau,f,\lambda)}{\mathrm{argmin}}z=\|\ \ddot{q}^{des}-\ddot{q}\ \|_{W_q}^2+\|\ \tau^{des}-\tau\ \|_{W_\tau}^2+\|\ f\ \|_{W_f}^2+\|\ \lambda\ \|_{W_\lambda}^2.$$

In the process of determining the variable values of the drive torque τ, the ground friction force f, and the closed-loop force λ, it is necessary to constrain the underactuated system robot.

In an example, the whole body dynamics model is constrained by dynamics model constraints. The dynamics model constraints include an inclination angle acceleration reference value.

The dynamics model constraints may be represented as:

$$M(q)\ddot{q}+C(q,\dot{q})=S^T\tau+J_f^Tf+J_\lambda^T\lambda.$$

The related description of the constraints may refer to the foregoing and will not be repeated herein.

In addition to being constrained by the dynamics model constraints, the underactuated system robot is also subject to at least one of the following constraints:

a closed-loop link constraint;

a constraint for wheels off upon slipping; and a friction constraint.

In the constraints, the closed-loop link constraint may be represented as:

$$J_\lambda\ddot{q}+\dot{J}_\lambda\dot{q}=0,\text{ where }J_\lambda^T=\left[J_{P_1,l}^T-J_{P_2,l}^T\ \ J_{P_1,r}^T-J_{P_2,r}^T\right]^T,\ J_{P_1},\text{ and }J_{P_2}$$

are Jacobian matrices of points $P_1$ and $P_2$, respectively.

Assuming that the wheels are purely rolling and in contact with the ground, and there is no slipping and sliding in the radial and axial directions of the wheels, the constraint for wheels off upon slipping may be represented as:

$${}_BJ_w^{(1,3)}\ddot{q}_B+\dot{J}_w^{(1,3)}\dot{q}=0,$$

where $${}_BJ_w^{(1,3)}$$

is the Jacobian matrix of the contact point between the wheel and the ground relative to the base portion.

In a local coordinate system $f_i$ of each contact force, a friction coefficient μ is given, a friction constraint may be formulated as $|f_{i,x}|\le\mu f_{i,z}$ and $|f_{i,y}|\le\mu f_{i,z}$, and a unilateral constraint may be represented as $f_{i,z}>0$.

In conclusion, in the motion control method of the mobile robot provided by this aspect of this disclosure, a target pose sequence signal and an interactive reference signal may be sequentially determined according to a tactile pressing operation. Then, control reference signals of a base portion and/or a wheel portion may be acquired by a whole body dynamics model, thereby realizing the control of the base portion and/or the wheel portion to realize an interactive motion of the mobile robot.

this aspect of this disclosure also provides an implementation of the whole body dynamics model of the underactuated system robot. It is to be understood that the above are examples and that variations of formulas or increases or decreases of commonly used variables based on the foregoing are included in the scope of protection of this disclosure.

Figures 26, 27:
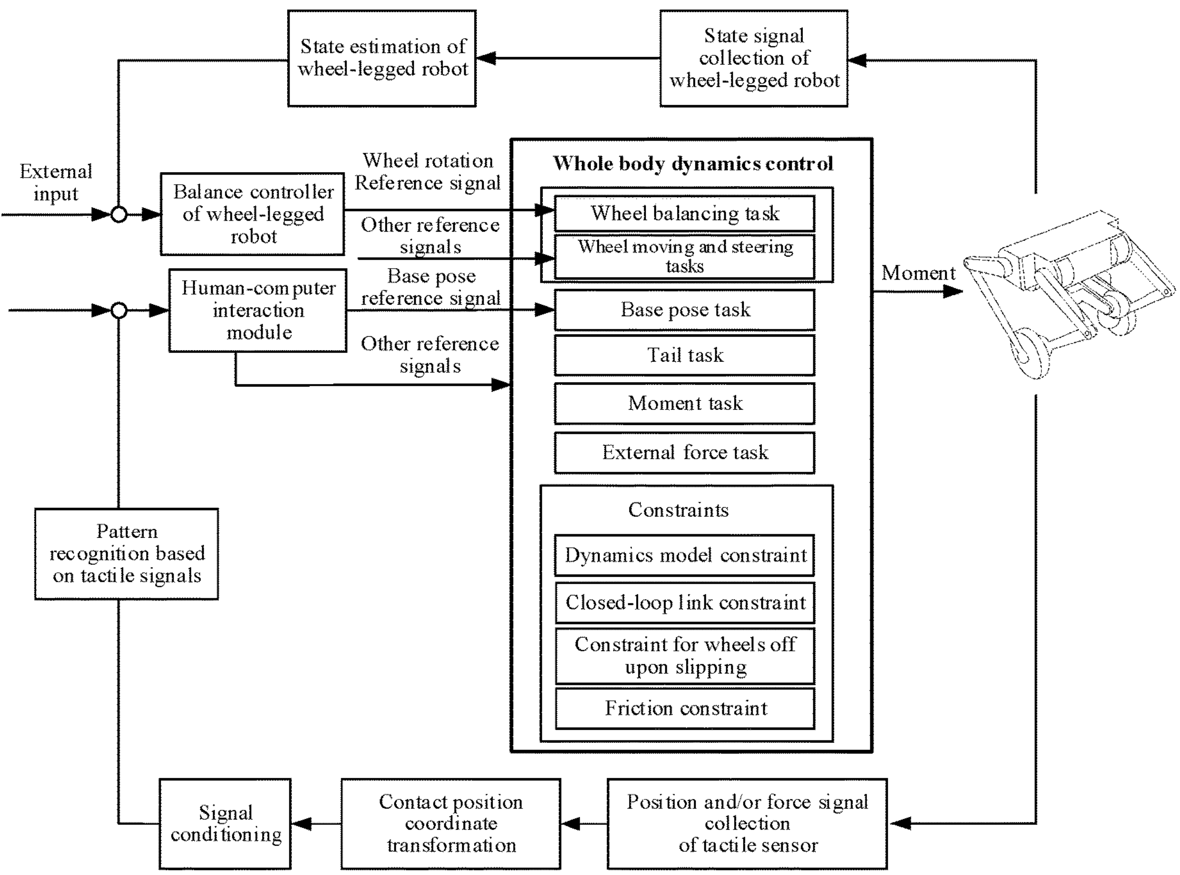
FIG. 26 is an overall control framework diagram of a mobile robot according to an exemplary aspect of this disclosure.
FIG. 27 is a schematic diagram of a motion control apparatus of a mobile robot according to an exemplary aspect of this disclosure.

FIG. 26 shows an overall control framework diagram of a mobile robot according to an exemplary aspect of this disclosure. The mobile robot is a wheel-legged robot in the underactuated system robot. The wheel-legged robot includes a balance controller and a human-computer interaction module. The balance controller is configured to complete the cycle of balance angle reference to realize the body balance of the wheel-legged robot. The human-computer interaction module is configured to control the interactive motion of the underactuated system robot.

In an example, the wheel-legged robot performs state estimation according to state signal collection. After the estimation is completed, a wheel rotation reference signal and other reference signals are determined by the balance controller to control the motion of the wheel portion. The wheel rotation reference signal is used for completing a wheel balance task, and other reference signals are used for completing wheel moving and steering tasks.

In an example, the wheel-legged robot performs contact position coordinate transformation according to pressing position and/or force information collection of the tactile pressing operation on the sensing device, performs signal conditioning, and then performs pattern recognition based on tactile signals on the conditioned signal. Then, a base pose signal and other reference signals are determined by the human-computer interaction module to control the motion of the base portion. In an example, the sensing device is a tactile sensor.

The base pose reference signal is used for completing the interactive motion of the underactuated system robot with other reference signals. The base pose reference signal is used for determining at least one of the inclination direction, inclination angle, and inclination speed of the base portion, and the other reference signals are used for determining other auxiliary information of the underactuated system robot, including information such as the height and movement mode of the underactuated system robot.

In an example, the pattern recognition based on tactile signals is used for indicating the process of determining an interactive reference signal according to the tactile pressing operation. The determined interactive reference signal may also be referred to as an interactive pattern. It is to be understood that after the signal conditioning, discrete contact information can be obtained. Then, pattern recognition is performed based on the discrete contact information (namely, tactile signals) to determine a motion type (namely, pattern recognition) of the corresponding interactive motion. The contact information is the target pose sequence signal. The specific descriptions of the process of determining an interactive reference signal according to the tactile pressing operation may refer to the foregoing and will not be repeated herein.

The position information and/or force information of the contact position may be obtained by the sensing device, and a correspondence between a force signal changing unit and the position of a pressure sensor array on the upper surface of the base portion may be described by the contact position coordinate transformation, signal conditioning, and relative angle calculation.

Through the contact position coordinate transformation, a force condition at each point on the sensing device may be determined at each time, thus obtaining continuous force changes. Based on the continuous force changes, the pressing type of the tactile pressing operation may be determined, and then the motion type of the interactive motion may be determined.

Through the signal conditioning, the force information of the upper surface of the underactuated system robot, that is, the force information of at least one contact point on the sensing device, may be determined.

It is to be understood that the relative angle calculation is the determination of the contact angle in the foregoing.

Exemplarily, after obtaining an electrical signal of the upper surface of the underactuated system robot, the underactuated system robot may be recognized by signal analysis, and the underactuated system robot may be controlled to perform an interactive motion according to the recognized information.

Four exemplary interaction scenarios will be given below:

1. A plate identifier obtained by plate identifier recognition may be used as a trigger signal for the underactuated system robot to move forward (take a step forward) or avoid (step back) and then turn around.
2. A contact angle obtained by contact angle recognition may be used as a trigger signal for the underactuated system robot to rotate to change the forward direction. If the contact angle is the direction of the operator, the underactuated system robot may follow the operator to rotate.
3. Recognition results of contact trajectory recognition may be drawing a circle, drawing U, drawing a heart, and the like, and may be used as a trigger signal for the underactuated system robot to rotate for a circle, squat, swing from side to side, and the like.
4. A real-time pressing signal of left-right or front-back sliding obtained by contact coordinate recognition may be used as a trigger signal for the underactuated system robot to shake left and right or front and back, so that the underactuated system robot may shake left and right or front and back with the sliding of the operator's finger.

It is to be understood that the output of the controller generates some reference signals for the whole body dynamics control, whether it is the balance control of the underactuated system robot or the execution of the above actions through the human-computer interaction module. These reference signals are inputted into the whole body dynamics controller, and a series of motor moments may be obtained by some optimization algorithms under the action of constraints. When these moments are inputted to the underactuated system robot, the state of the underactuated system robot at a next time may be obtained. Then, the state at the next time is collected by signals, and applied to the balance control at the next time and the action sequence control of the underactuated system robot.

According to the foregoing, the whole motion of the wheel-legged robot is controlled by whole body dynamics, so that the motions of the wheel portion and the base portion are required to meet the needs of the whole body dynamics control.

In the whole body dynamics control, different control tasks are added according to the whole body dynamics model, and the mapping between angular acceleration information of joint space and task space and joint moments is established by considering the physical constraints of the body. By transmitting the joint moments to corresponding drive motors of the wheel-legged robot, the joint force control of the robot is realized, and then the shape, pose, and position of the robot in space are changed.

For example, control tasks include a wheel balancing task, wheel moving and steering tasks, a base pose task, a tail task, a moment task, and an external force task.

The wheel balancing task is required to maintain the balance of the upper body pose of the robot, and the wheel moving and steering tasks are required to meet the tasks of the robot moving forward and backward and steering in the yaw direction. The base pose task may realize the base rotation in the pitch, roll, and yaw directions and translation in x, y, and z directions. The tail task may place the tail to a specified position by giving a joint angle value corresponding to the tail. The moment task is generally to introduce the integral of the sum of squares of the joint motor moment with time into a cost function, to ensure that the joint moment value falls within a finite value range in the process of optimization solution. The external force task includes external forces corresponding to three directions at contact points between two wheels and the ground, and the integral of the sum of squares of the external forces with time is introduced into the cost function, to ensure that the values of each external force fall within a finite value range in the process of optimization solution.

In an example, the whole body dynamics model is subject to a plurality of constraints, including a dynamics model constraint, a closed-loop link constraint, a constraint for wheels off upon slipping, and a friction constraint.

In conclusion, this aspect of this disclosure provides an overall control framework of a mobile robot which is, for example, a wheel-legged robot.

Aspects of this disclosure also provides a mobile robot.

In an aspect, the mobile robot includes a wheel portion and a base portion connected to the wheel portion. The base portion is provided with a sensing device. The mobile robot is provided with a controller. The controller is configured to control the mobile robot to implement the motion control method of the mobile robot as described above.

In an aspect, the sensing device is a device for detecting contact information between the mobile robot and the outside. In some aspects, the sensing device is a force/tactile sensing device and may also be represented as a force-tactile sensing device. The sensing device may be implemented as any one of a force sensor, a tactile sensor, and a force-tactile sensor.

The controller may be set according to actual needs, which is not limited in this disclosure. Any mobile robot that can realize an interactive motion based on a tactile pressing operation is within the scope of protection of this disclosure. The motion control method of the mobile robot has been described in detail in the aforementioned content, which may be used for reference and will not be repeated herein.

The following describes apparatus aspects of this disclosure. For details which are not described in detail in the apparatus aspects, reference may be made to the corresponding description of the foregoing method aspects. The details will not be repeated herein.

FIG. 27 shows a schematic diagram of a motion control apparatus of a mobile robot according to an exemplary aspect of this disclosure. The mobile robot includes a wheel portion and a base portion connected to the wheel portion. The base portion is provided with a sensing device. The apparatus includes:

a receiving module 2720, configured to receive a tactile pressing operation on the sensing device; and a control module 2740, configured to control the mobile robot to perform an interactive motion in response to the tactile pressing operation.

The interactive motion is a motion corresponding to the tactile pressing operation. At least one of the wheel portion and the base portion performs a motion during the interactive motion.

In an example, the tactile pressing operation includes at least one of the following operations: a single-point pressing operation, the single-point pressing operation being an instantaneous touch performed on the sensing device, and the instantaneous touch not forming a moving trajectory on the sensing device; and a continuous pressing operation, the continuous pressing operation being a continuous touch on the sensing device, and the continuous touch forming a moving trajectory on the sensing device.

In an example, the interactive motion includes one of the following motions: a moving motion, the steering motion being a displacement motion performed by the mobile robot; a steering motion, the steering motion being a motion of changing a forward direction of the mobile robot; a shaking motion, the shaking motion being a body shaking motion of the mobile robot according to a moving trajectory of the tactile pressing operation; a turning motion, the turning motion being a one-circle rotation motion performed by the mobile robot; a fluctuating motion, the fluctuating motion being a motion in which a vertical height of the mobile robot changes; and a swinging motion, the swinging motion being a body swinging motion performed by the mobile robot.

In an example, the interactive motion includes a first moving motion. The control module 2740 is configured to control the mobile robot to move by a first distance in a forward direction in response to a first single-point pressing operation.

In an example, the interactive motion includes a second moving motion. The control module 2740 is configured to: control the mobile robot to move by a second distance in a backward direction in response to a second single-point pressing operation; or, control the mobile robot to move by the second distance in the backward direction in response to the second single-point pressing operation, control the wheel portion to rotate upon moving by the second distance, and update the background direction to a forward direction of the mobile robot at a next time.

In an example, the interactive motion includes a steering motion. The control module 2740 is configured to control the wheel portion to rotate in response to a third single-point pressing operation, to update the forward direction of the mobile robot to a rotation direction. The rotation direction is a direction of a contact position of the third single-point pressing operation relative to a center position of the sensing device.

In an example, the interactive motion includes a first shaking motion. The first shaking motion is a motion in a shaking direction that is a direction of the wheel portion relative to the base portion. The control module 2740 is configured to: control the base portion to be inclined in a first direction in response to a first continuous pressing operation; and control the wheel portion to alternately change a leg height. The first direction is a direction of a first initial contact position of the first continuous pressing operation on the sensing device relative to a center position of the sensing device, and an alternate change in the leg height of the wheel portion is determined according to at least two contact positions corresponding to the first continuous pressing operation.

In an example, the interactive motion includes a second shaking motion. The second shaking motion is a motion in a shaking direction that is a forward direction or a backward direction of the mobile robot. The control module 2740 is configured to: control, in response to a second continuous pressing operation, a first wheel leg support rod of the wheel portion to be shortened and a second wheel leg support rod to be lengthened, so that the base portion is inclined in a second direction; and control the first wheel leg support rod and the second wheel leg support rod to be alternately lengthened and shortened. The first wheel leg support rod is a rod in the wheel portion close to a first position, and the second wheel leg support rod is a rod in the wheel portion away from the first position. The first position is a second initial contact position of the second continuous pressing operation on the sensing device, and the second direction is a direction of the second initial contact position relative to a center position of the sensing device. An alternate change in the leg height of the wheel portion is determined according to at least two contact positions corresponding to the second continuous pressing operation.

In an example, the interactive motion includes a turning motion. The control module 2740 is configured to control the wheel portion to rotate by 360 degrees in response to a third continuous pressing operation.

In an example, the interactive motion includes a fluctuating motion. The control module 2740 is configured to: control the wheel portion to ascend and then descend vertically in response to a fourth continuous pressing operation until the mobile robot returns to the state before the fourth continuous pressing operation; or, control the wheel portion to descend and then ascend vertically in response to the fourth continuous pressing operation until the mobile robot returns to the state before the fourth continuous pressing operation. The base portion performs a translational motion during the vertical ascending and descending of the wheel portion.

In an example, the interactive motion includes a swinging motion. The swinging motion is a motion in a swinging direction that is a direction of the wheel portion relative to the base portion. The control module 2740 is configured to control the wheel portion to alternately change a leg height with a fixed height in response to a fifth continuous pressing operation, so that a body of the mobile robot is inclined and swung.

In an example, the tactile pressing operation is a stick figure sketching operation on the sensing device that imitates a biological motion state. The control module 2740 is configured to control the motion of at least one of the wheel portion and the base portion in response to the stick figure sketching operation, to control the mobile robot to perform a bionic motion corresponding to the stick figure sketching operation in a case that a body balance is maintained. The bionic motion is a motion that imitates the biological motion state corresponding to the stick figure sketching operation, or the bionic motion is a motion that responds to the biological motion state corresponding to the stick figure sketching operation.

The control module 2740 is configured to: control the mobile robot to perform a first interactive motion in response to a first tactile pressing operation; and control the mobile robot to perform a second interactive motion in response to a second tactile pressing operation. The first tactile pressing operation and the second tactile pressing operation are of the same type, and the first tactile pressing operation and the second tactile pressing operation obtain different contact positions and/or force information of contacts.

In an example, in a case that the bionic motion is a motion that imitates the biological motion state corresponding to the stick figure sketching operation, the control module 2740 is configured to control, in response to the stick figure sketching operation, the mobile robot to perform a motion with the same motion trajectory as a moving trajectory of the stick figure sketching operation on the sensing device while maintaining the body balance.

In an example, in a case that the bionic motion is a motion that responds to the biological motion state corresponding to the stick figure sketching operation, the control module 2740 is configured to: control, in response to the stick figure sketching operation, the mobile robot to perform a motion in an operation mode indicated by the stick figure sketching operation while maintaining the body balance; or, control, in response to the stick figure sketching operation, the mobile robot to perform a force feedback motion of the biological motion state corresponding to the stick figure sketching operation while maintaining the body balance; or, control, in response to the stick figure sketching operation, the mobile robot to perform a motion in the same or opposite state of the biological motion state corresponding to the stick figure sketching operation based on the environmental information of the mobile robot while maintaining the body balance.

In an example, the body balance of the mobile robot is maintained through the control of a whole body dynamics model of the mobile robot.

In an example, a first sensing device is provided outside a position where the wheel portion is connected to the base portion, a second sensing device is provided outside a joint position of the wheel portion, and a third sensing device is provided outside a wheel of the wheel portion. The receiving module 2720 is further configured to acquire force information on at least one of the first sensing device, the second sensing device, and the third sensing device. The control module 2740 is further configured to control the mobile robot to perform an interactive motion for the wheel portion according to the force information.

In an example, the control module 2740 is configured to control the mobile robot to perform an interactive motion based on the force information and/or a road condition in which the mobile robot is located in response to the tactile pressing operation.

In an example, the receiving module 2720 is further configured to display environmental information of the mobile robot on the sensing device. The environmental information is determined in one of the following modes: calling map information of a location of the mobile robot, acquiring a visual signal of the mobile robot, and performing simultaneous localization and mapping according to a historical moving path of the mobile robot. The control module 2740 is configured to control the mobile robot to perform the interactive motion in response to a tactile pressing operation on the environmental information.

In an example, the control module 2740 is configured to: determine a target pose sequence signal corresponding to the tactile pressing operation in response to the tactile pressing operation; determine an interactive reference signal corresponding to the target pose sequence signal according to the target pose sequence signal, the target pose sequence signal uniquely corresponding to one interactive reference signal; and control the mobile robot to perform the interactive motion according to the interactive reference signal.

In an example, the control module 2740 is configured to perform, in response to the tactile pressing operation, single-point signal analysis or continuous multi-point signal analysis through the sensing device to determine the target pose sequence signal.

In an example, the single-point signal analysis includes at least one of contact coordinate recognition, contact angle recognition, and plate identifier recognition. The continuous multi-point signal analysis includes contact trajectory recognition.

In an example, the target pose sequence signal includes at least one of the following information: a contact coordinate of at least one contact point on the sensing device; a contact angle of the at least one contact point; a plate identifier of a plate where the at least one contact point is located, the sensing device being partitioned to obtain more than two plates; and force information of the at least one contact point, the force information including at least one of a force magnitude, a force direction, and a force angle.

The control module 2740 is configured to: determine moment information of the base portion and/or the wheel portion by taking the interactive reference signal and a whole body dynamics model of the mobile robot as inputs of a closed-loop PID controller; and control the mobile robot to perform the interactive motion according to the moment information.

Figure 28:
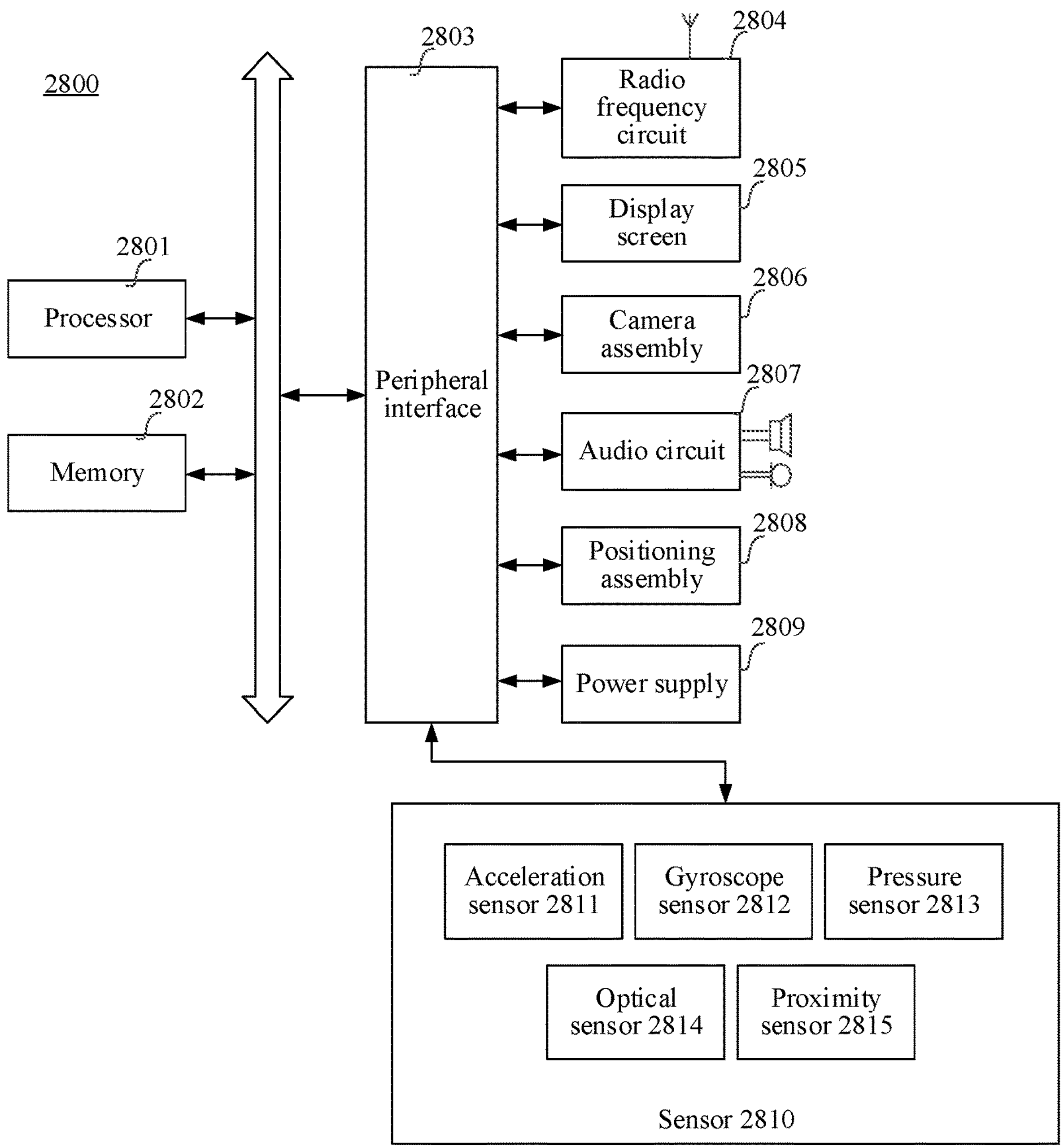
FIG. 28 is a block diagram of an electronic device according to an exemplary aspect of this disclosure.

FIG. 28 shows a structural block diagram of an electronic device 2800 according to an exemplary aspect of this disclosure.

The electronic device 2800 may be a portable mobile terminal. For example, the electronic device is an electronic device for controlling a mobile robot, a smartphone, a tablet personal computer, a moving picture experts group audio layer III (MP3) player, a moving picture experts group audio layer IV (MP4) player, a laptop computer, or a desktop computer. The electronic device 2800 may also be referred to as a user equipment, a portable terminal, a laptop terminal, a desktop terminal, or the like. In this aspect of this disclosure, the electronic device 2800 may be implemented as a control device portion in a robot.

Generally, the electronic device 2800 includes: a processor 2801 and a memory 2802.

The processor 2801 may include one or more processing cores, for example, a 4-core processor or an 8-core processor. The processor 2801 may be implemented in at least one hardware form of a digital signal processor (DSP), a field-programmable gate array (FPGA), and a programmable logic array (PLA).

The memory 2802 may include one or more computer-readable storage media. The computer-readable storage medium may be non-transient. The memory 2802 may further include a high-speed random access memory and a nonvolatile memory, for example, one or more disk storage devices or flash storage devices. In some aspects, the non-transient computer-readable storage medium in the memory 2802 is configured to store at least one instruction. The at least one instruction is used for execution by the processor 2801 to implement the motion control method of the mobile robot according to the method aspects of this disclosure.

In some aspects, the electronic device 2800 may further include: a peripheral interface 2803 and at least one peripheral. The processor 2801, the memory 2802, and the peripheral interface 2803 may be connected through a bus or a signal cable. Each peripheral may be connected to the peripheral interface 2803 through a bus, a signal cable, or a circuit board. Specifically, the peripheral includes: at least one of a radio frequency circuit 2804, a display screen 2805, a camera assembly 2806, an audio circuit 2807, a positioning assembly 2808, and a power supply 2809.

In some aspects, the electronic device 2800 further includes one or more sensors 2810. The one or more sensors 2810 include, but are not limited to, an acceleration sensor 2811, a gyroscope sensor 2812, a pressure sensor 2813, an optical sensor 2814, and a proximity sensor 2815.

It is to be understood by a person skilled in the art that the structure shown in FIG. 28 is not limiting of the electronic device 2800 and may include more or fewer assemblies than illustrated, or some assemblies may be combined, or different assembly arrangements may be employed.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to Care intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

Aspects of this disclosure also provides a computer device. The computer device includes a memory and a processor. The memory stores at least one program code. The program code is loaded and executed by the processor to implement the motion control method of the mobile robot as described above.

Aspects of this disclosure also provide a computer-readable storage medium, such as a non-transitory computer-readable storage medium. The storage medium stores a computer program. The computer program is executed by a processor to implement the motion control method of the mobile robot as described above.

Aspects of this disclosure also provide a chip. The chip includes a programmable logic circuit and/or program instructions for implementing the motion control method of the mobile robot as described above when the chip is operated.

Aspects of this disclosure also provide a computer program product or a computer program. The computer program product or the computer program includes computer instructions. The computer instructions are stored in a computer-readable storage medium, and a processor reads and executes the computer instructions from the computer-readable storage medium to implement the motion control method of the mobile robot as described above.

What is claimed is:

1. A motion control method of a mobile robot, the method comprising:

receiving a tactile touch operation on a sensing device of the mobile robot, the sensing device being divided into a plurality of subregions, the tactile touch operation being a selected one of a plurality of predefined tactile touch operations, each of the plurality of predefined tactile touch operations being defined according to an order of touched subregions of the plurality of subregions of the sensing device and a path of the predefined tactile touch operation; and controlling the mobile robot to perform an interactive motion of a plurality of interactive motions that is associated with the tactile touch operation, each of the plurality of interactive motions being associated with a respective predefined tactile touch operation of the plurality of predefined tactile touch operations, wherein the interactive motion corresponds to the tactile touch operation, and at least one of a wheel portion or a base portion of the mobile robot performs the interactive motion.

2. The method according to claim 1, further comprising:

determining the interactive motion based on a touch position of the tactile touch operation.

3. The method according to claim 2, wherein the determining the interactive motion comprises:

determining the interactive motion based on which of the plurality of subregions of the sensing device includes the touch position of the tactile touch operation.

4. The method according to claim 2, wherein the determining the interactive motion comprises:

determining the interactive motion based on force information of the tactile touch operation.

5. The method according to claim 1, wherein the interactive motion includes a first moving motion, the tactile touch operation includes a single-point touch operation, and the controlling the mobile robot to perform the interactive motion includes controlling the mobile robot to move by a first distance in a first direction based on a touch position of the single-point touch operation.

6. The method according to claim 1, wherein the interactive motion includes a steering motion, the tactile touch operation includes a single-point touch operation, and the controlling the mobile robot to perform the interactive motion includes controlling the wheel portion to rotate the mobile robot in a rotation direction that is based on a touch position of the single-point touch operation relative to a reference position of the sensing device.

7. The method according to claim 1, wherein the tactile touch operation includes a continuous touch operation;

the interactive motion includes a shaking motion, the shaking motion being in a shaking direction that is a direction of the wheel portion relative to the base portion; and the controlling the mobile robot to perform the interactive motion comprises:

controlling the base portion to be inclined in an inclination direction in response to the continuous touch operation, and controlling the wheel portion to alternately change leg heights, wherein the inclination direction is of an initial contact position of the continuous touch operation on the sensing device relative to a reference position of the sensing device, and the changes in the leg heights of the wheel portion are based on at least two touch positions corresponding to the continuous touch operation.

8. The method according to claim 1, wherein the interactive motion comprises a shaking motion, the shaking motion being in a shaking direction that is a forward direction or a backward direction of the mobile robot;

the tactile touch operation includes a continuous touch operation; and the controlling the mobile robot to perform the interactive motion comprises:

controlling, in response to the continuous touch operation, a first wheel leg support rod of the wheel portion to be shortened and a second wheel leg support rod of the wheel portion to be lengthened, so that the base portion is inclined in an inclination direction; and controlling the first wheel leg support rod and the second wheel leg support rod to be alternately lengthened and shortened, wherein the first wheel leg support rod and the second wheel leg support rod are included in the wheel portion, the first wheel leg support rod is closer to a first position than the second wheel leg support rod, the first position is an initial contact position of the continuous touch operation on the sensing device, the inclination direction is of the initial contact position relative to a reference position of the sensing device, and the lengthening and shortening of the first wheel leg support rod and the second wheel leg support rod of the wheel portion are based on at least two touch positions corresponding to the continuous touch operation.

9. The method according to claim 1, wherein the interactive motion includes a turning motion;

the tactile touch operation includes a continuous touch operation; and the controlling the mobile robot to perform the interactive motion includes controlling the wheel portion to rotate by 360 degrees in response to the continuous touch operation.

10. The method according to claim 1, wherein the interactive motion includes a fluctuating motion;

the tactile touch operation includes a continuous touch operation;

the controlling the robot to perform the interactive motion includes controlling the wheel portion to ascend and descend vertically in response to the continuous touch operation until the mobile robot returns to a state before the continuous touch operation; and the base portion performs a translational motion during the vertical ascending and descending of the wheel portion.

11. The method according to claim 1, wherein the interactive motion comprises a swinging motion in a swinging direction that is of the wheel portion relative to the base portion;

the tactile touch operation includes a continuous touch operation; and the controlling the mobile robot to perform the interactive motion includes controlling the wheel portion to alternately change a leg height with a fixed height in response to the continuous touch operation, so that the base portion of the mobile robot is inclined and swings.

12. The method according to claim 1, wherein the controlling the mobile robot to perform the interactive motion comprises:

controlling the mobile robot to perform a first interactive motion of the plurality of interactive motions in response to a first tactile touch operation; and controlling the mobile robot to perform a second interactive motion of the plurality of interactive motions in response to a second tactile touch operation, the first tactile touch operation and the second tactile touch operation having at least one of different touch positions or different touch forces.

13. The method according to claim 1, wherein the tactile touch operation includes a continuous touch operation on the sensing device that imitates a biological motion state; and the controlling the mobile robot to perform the interactive motion comprises:

controlling the motion of at least one of the wheel portion or the base portion in response to the continuous touch operation, to control the mobile robot to perform a bionic motion corresponding to the continuous touch operation when a balance of the base portion is maintained, the bionic motion being based on the biological motion state corresponding to the continuous touch operation.

14. The method according to claim 1, wherein:

the sensing device is one of a first sensing device, a second sensing device, and a third sensing device, the first sensing device is provided at a position where the wheel portion is connected to the base portion, the second sensing device is provided at a joint position of the wheel portion, and the third sensing device is provided at a wheel of the wheel portion; and the method further comprises:

acquiring force information on at least one of the first sensing device, the second sensing device, or the third sensing device; and controlling the mobile robot to perform the interactive motion for the wheel portion according to the force information.

15. The method according to claim 1, further comprising:

displaying environmental information of a surrounding environment of the mobile robot on the sensing device, wherein the controlling the mobile robot to perform the interactive motion includes controlling the mobile robot to perform the interactive motion in response to the tactile touch operation on the environmental information.

16. A motion control apparatus of a mobile robot, the motion control apparatus comprising:

processing circuitry configured to:

receive a tactile touch operation on a sensing device of the mobile robot, the sensing device being divided into a plurality of subregions, the tactile touch operation being a selected one of a plurality of predefined tactile touch operations, each of the plurality of predefined tactile touch operations being defined according to an order of touched subregions of the plurality of subregions of the sensing device and a path of the predefined tactile touch operation; and control the mobile robot to perform an interactive motion of a plurality of interactive motions that is associated with the tactile touch operation, each of the plurality of interactive motions being associated with a respective predefined tactile touch operation of the plurality of predefined tactile touch operations, wherein the interactive motion corresponds to the tactile touch operation, and at least one of a wheel portion or a base portion of the mobile robot performs the interactive motion.

17. The motion control apparatus according to claim 16, wherein the processing circuitry is configured to:

determine the interactive motion based on a touch position of the tactile touch operation.

18. The motion control apparatus according to claim 17, wherein the processing circuitry is configured to:

determine the interactive motion based on which of the plurality of subregions of the sensing device includes the touch position of the tactile touch operation.

19. A mobile robot, comprising:

a wheel portion and a base portion connected to the wheel portion;

a sensing device on the base portion; and the motion control apparatus according to claim 18.

20. A non-transitory computer-readable storage medium storing instructions which, when executed by a processor, cause the processor to perform:

receiving a tactile touch operation on a sensing device of a mobile robot, the sensing device being divided into a plurality of subregions, the tactile touch operation being a selected one of a plurality of predefined tactile touch operations, each of the plurality of predefined tactile touch operations being defined according to an order of touched subregions of the plurality of subregions of the sensing device and a path of the predefined tactile touch operation; and controlling the mobile robot to perform an interactive motion of a plurality of interactive motions that is associated with the tactile touch operation, each of the plurality of interactive motions being associated with a respective predefined tactile touch operation of the plurality of predefined tactile touch operations, wherein the interactive motion corresponds to the tactile touch operation, and at least one of a wheel portion or a base portion of the mobile robot performs the interactive motion.

* * * * *